United States Patent
Otake et al.

(10) Patent No.: US 8,027,762 B2
(45) Date of Patent: Sep. 27, 2011

(54) DRIVING ASSIST APPARATUS

(75) Inventors: Yukio Otake, Mishima (JP); Toshiki Kindo, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 310 days.

(21) Appl. No.: 12/480,169

(22) Filed: Jun. 8, 2009

(65) Prior Publication Data
US 2009/0326751 A1    Dec. 31, 2009

(30) Foreign Application Priority Data

Jun. 16, 2008 (JP) ................. P2008-156682

(51) Int. Cl.
*G08G 1/0962* (2006.01)
*G08G 1/16* (2006.01)
(52) U.S. Cl. ............... 701/23; 701/25; 701/117
(58) Field of Classification Search ........ 701/25
See application file for complete search history.

(56) References Cited

U.S. PATENT DOCUMENTS

| | | | | |
|---|---|---|---|---|
| 6,072,409 | A * | 6/2000 | Fushimi et al. | 340/995.19 |
| 2002/0019703 | A1* | 2/2002 | Levine | 701/301 |
| 2005/0125121 | A1* | 6/2005 | Isaji et al. | 701/36 |
| 2006/0217879 | A1* | 9/2006 | Ikeuchi et al. | 701/208 |
| 2006/0220905 | A1* | 10/2006 | Hovestadt | 340/901 |
| 2008/0162027 | A1* | 7/2008 | Murphy et al. | 701/117 |
| 2008/0303696 | A1* | 12/2008 | Aso et al. | 340/935 |

FOREIGN PATENT DOCUMENTS

| | | |
|---|---|---|
| JP | 04-286100 | 10/1992 |
| JP | 08-299520 | 11/1996 |
| JP | 2001-126198 | 5/2001 |
| JP | 2002-213970 | 7/2002 |
| JP | 2005-337963 | 12/2005 |
| JP | 2006-500664 | 1/2006 |
| JP | 2006-131055 | 5/2006 |
| JP | 2006-154967 | 6/2006 |
| JP | 2008-117082 | 5/2008 |
| JP | 2008-123217 | 5/2008 |

OTHER PUBLICATIONS

Japanese Notice of Allowance issued Oct. 5, 2010, in Patent Application No. P2008-156682.

* cited by examiner

*Primary Examiner* — Shelley Chen
(74) *Attorney, Agent, or Firm* — Oblon, Spivak, McClelland, Maier & Neustadt, L.L.P.

(57) ABSTRACT

A driving assist apparatus 1 that performs driving assist on the basis of a traffic rule of a mobile object includes a traffic rule acquisition unit 11, 12, and 13 acquiring a traffic rule which a mobile object is highly likely to observe in an arbitrary region, and performs driving assist on the basis of the traffic rule acquired by the traffic rule acquisition unit. In particular, the driving assist apparatus includes a region acquisition unit 13 acquiring a traffic rule deviation region where a defined traffic rule in an arbitrary region does not conform to the traffic rule acquired by the traffic rule acquisition unit, or a traffic rule correction unit correcting the traffic rule acquired by the traffic rule acquisition unit when a defined traffic rule in an arbitrary region does not conform to the traffic rule acquired by the traffic rule acquisition unit.

17 Claims, 18 Drawing Sheets

DRIVING ASSIST APPARATUS

BACKGROUND OF THE INVENTION

1. Field of the Invention

The present invention relates to a driving assist apparatus.

2. Related Background Art

A technique is developed which generates an optimal travel path of a host-vehicle and performs automatic driving control or various kinds of driving assist control on the basis of the travel path. With regard to such control, for safe travel, travel control is performed such that the host-vehicle observes the traffic rules of the road, such as traffic lights, speed limits, stop signs (refer to Patent Document 1).

Patent Document 1: Japanese Patent Application Publication No. 2006-131055.

Patent Document 2: Japanese Patent Application Publication No. 2006-500664.

Patent Document 3: Japanese Patent Application Publication No. 2002-213970.

SUMMARY OF THE INVENTION

Usually, the above-described travel control is performed on the premise that mobile objects, such as other vehicles around the host-vehicle, or the like, observe the traffic rules. However, even though the host-vehicle observes the traffic rules, a mobile object around the host-vehicle may violate the traffic rules. When a mobile object around the host-vehicle violates the traffic rules, safety is deteriorated due to the relationship between the mobile object and the host-vehicle, and with regard to the host-vehicle, appropriate travel control is not performed.

Accordingly, it is an object of the invention to provide a driving assist apparatus that is capable of performing appropriate driving assist with respect to a host-vehicle even if a mobile object around the host-vehicle violates the defined traffic rule.

An aspect of the invention provides a driving assist apparatus that performs driving assist on the basis of a traffic rule which will be observed by a mobile object. The driving assist apparatus performs driving assist on the basis of the probability that the mobile object will observe a traffic rule in an arbitrary region.

Each road region (for example, an intersection) where the mobile objects, such as vehicles and the like, are crowded has a road condition or road structure unique to the road region. For this reason, the probability that a mobile object will actually observe a traffic rule in each region varies, regardless of the predefined traffic rule in the region. Accordingly, this driving assist apparatus performs driving assist on the basis of the probability that a mobile object will observe the traffic rule in each region. Thus, the driving assist apparatus performs driving assist on the basis of the probability that the traffic rule is actually observed in each region, thereby performing appropriate driving assist with respect to the host-vehicle.

The driving assist apparatus according to the aspect of the invention may include a traffic rule acquisition unit acquiring a traffic rule which the mobile object is highly likely to observe in an arbitrary region. Driving assist is performed on the basis of the traffic rule acquired by the traffic rule acquisition unit.

In each road region (for example, an intersection) where the mobile object, such as vehicles and the like, are crowded, a traffic rule which differs from the predefined traffic rule with respect to the relevant region may be applied due to a road condition or road structure unique to the relevant region (that is, the mobile objects normally violate a defined traffic rule). For example, at an intersection where a priority road and a non-priority road intersect each other and where no traffic lights exist, when the road width of the non-priority road is wider than that of the priority road, a vehicle that is traveling on the priority road usually stops. At such an intersection, in terms of high safety, a vehicle that is traveling on the priority road desirably stops, rather than a vehicle that is traveling on the non-priority road does. Accordingly, in this driving assist apparatus, the traffic rule acquisition unit acquires a traffic rule which a mobile object is highly likely to observe in an arbitrary region (that is, a traffic rule which is actually observed in this region, and when a traffic rule is predefined, a traffic rule which violates a predefined traffic rule). Therefore, the driving assist apparatus performs driving assist on the basis of a traffic rule which a mobile object is highly likely to observe in each region. Thus, the driving assist apparatus performs driving assist giving priority to a traffic rule which is highly likely to be actually observed in each region, thereby performing appropriate driving assist with respect to the host-vehicle even though a mobile object around the host-vehicle violates a predefined traffic rule. As a result, safety can be improved.

A mobile object is, for example, a vehicle, a two-wheeled motor vehicle, a bicycle, or a pedestrian. The term "traffic rule" is a concept including various traffic laws and traffic manners. Let us say that the traffic rule includes rules for vehicles and rules for other mobile objects, such as pedestrians, bicycles, and the like. Driving assist includes, for example, information provision, warning, travel control, automatic driving control, and the like.

The driving assist apparatus according to the aspect of the invention may include a region acquisition unit acquiring a traffic rule deviation region where a defined traffic rule in an arbitrary region does not conform to the traffic rule acquired by the traffic rule acquisition unit.

In this driving assist apparatus, the region acquisition unit acquires the traffic rule deviation region where a predefined traffic rule in an arbitrary region does not conform to a traffic rule which is highly likely to be actually observed in the region. Thus, the driving assist apparatus performs appropriate driving assist with respect to the host-vehicle by using the traffic rule deviation region, thereby further increasing safety. In such a traffic rule deviation region, a mobile object around the host-vehicle is highly likely not to observe the predefined traffic rule. For this reason, it is necessary to notify the driver of the host-vehicle with relevant information, or to perform travel control or automatic driving control in accordance with a traffic rule which is highly likely to be actually observed (a traffic rule which violates the defined traffic rule).

The driving assist apparatus according to the aspect of the invention may include a traffic rule correction unit which corrects the traffic rule acquired by the traffic rule acquisition unit when a defined traffic rule in an arbitrary region does not conform to the traffic rule acquired by the traffic rule acquisition unit.

In this driving assist apparatus, when a predefined traffic rule in an arbitrary region does not conform to a traffic rule which is highly likely to be actually observed in the region, the traffic rule correction unit corrects the traffic rule in accordance with the traffic rule which is highly likely to be actually observed in the region. Thus, the driving assist apparatus performs appropriate driving assist with respect to the host-vehicle in accordance with the corrected traffic rule, thereby further increasing safety. A mobile object around the host-vehicle is highly likely to observe the corrected traffic rule, so the behavior of the mobile object can be predicted with high accuracy and safety can be improved by the relationship with the mobile object.

The driving assist apparatus according to the aspect of the invention may include a host-vehicle travel path acquisition unit acquiring a plurality of travel paths of the host-vehicle. A travel path of the host-vehicle may be selected from among the plurality of travel paths of the host-vehicle on the basis of the traffic rule acquired by the traffic rule acquisition unit, and driving assist may be performed with respect to the host-vehicle on the basis of the selected travel path of the host-vehicle.

In this driving assist apparatus, the host-vehicle travel path acquisition unit acquires a plurality of travel paths of the host-vehicle for automatic driving control or travel control. Accordingly, the driving assist apparatus selects a travel path, which observes a traffic rule which is highly likely to be actually observed, from among the plurality of travel paths of the host-vehicle, and performs automatic driving control or travel control with respect to the host-vehicle on the basis of the selected travel path. Thus, the driving assist apparatus performs driving assist with respect to the host-vehicle in accordance with a travel path, which observes a traffic rule which is highly likely to be actually observed in each region, thereby ensuring safety by the relationship with a mobile object around the host-vehicle and improving efficiency when the host-vehicle travels toward a destination. As a result, safety and efficiency can be achieved together satisfactorily.

The driving assist apparatus according to the aspect of the invention may include a mobile object travel path acquisition unit acquiring a plurality of travel paths of the mobile object. A travel path of the mobile object may be selected from among the plurality of travel paths of the mobile object on the basis of the traffic rule acquired by the traffic rule acquisition unit, and driving assist may be performed with respect to the host-vehicle in accordance with the selected travel path of the mobile object.

In this driving assist apparatus, the mobile object travel path acquisition unit acquires a plurality of travel paths of the mobile object around the host-vehicle. Accordingly, the driving assist apparatus selects a travel path, which observes a traffic rule which is highly likely to be actually observed, from among the plurality of travel paths of the mobile object, and automatic driving control, travel control, or the like is performed with respect to the host-vehicle on the basis of the selected travel path of the mobile object. Thus, the driving assist apparatus performs driving assist with respect to the host-vehicle by using a travel path of the mobile object which observes a traffic rule which is highly likely to be actually observed in each region, so the behavior of the mobile object can be predicted with high accuracy and safety can be improved by the relationship with the mobile object.

According to the invention, driving assist is performed on the basis of the probability that a traffic rule is actually observed in each region, such that appropriate driving assist can be performed with respect to the host-vehicle. In particular, according to the invention, driving assist is performed giving priority to a traffic rule which is highly likely to be actually observed in each region. Therefore, even though a mobile object around the host-vehicle violates a defined traffic rule, appropriate driving assist can be performed with respect to the host-vehicle.

DESCRIPTION OF THE PREFERRED EMBODIMENTS

Hereinafter, an embodiment of a driving assist apparatus according to the invention will be described with reference to the drawings.

In this embodiment, the driving assist apparatus according to the invention is applied to a risk region determination device, a rule correction device, a driving assist apparatus, and an automatic driving apparatus, which are mounted on a vehicle. The risk region determination device according to this embodiment determines a risk region where a predefined traffic rule in each region (at an intersection, at a junction, or the like) is highly likely to be violated, and provides information on the risk region to various driving assist apparatuses or automatic driving apparatuses. The rule correction device according to this embodiment corrects a traffic rule in each region to a traffic rule which is highly likely to be actually observed, and provides the corrected traffic rule to various driving assist apparatuses or automatic driving apparatuses. The driving assist apparatus according to this embodiment emits a warning sound to a driver when the host-vehicle is highly likely to violate a traffic rule in each region. The automatic driving apparatus according to this embodiment generates a target path of the host-vehicle on the basis of a traffic rule which is highly likely to be actually observed in each region, and performs automatic driving control such that the host-vehicle travels along the target path.

With regard to the risk region determination device and the rule correction device according to this embodiment, two embodiments are implemented: in a first embodiment, a traffic rule based on a road structure in each region is set as a traffic rule which is highly likely to be observed; and in a second embodiment, a traffic rule based on traffic know-how (actual traffic condition) in each region is set as a traffic rule which is highly likely to be observed. The driving assist apparatus and the automatic driving apparatus according to this embodiment use either the rule correction device according to the first embodiment or the rule correction device according to the second embodiment.

In this embodiment, a description will be provided mainly regarding a traffic rule representing the priority-to-non-priority relationship between the roads. In particular, in the second embodiment, let us say that the priority-to-non-priority relationship between the roads also includes one-way traffic which represents absolute priority. In this embodiment, let us say that the traffic rule is applied to mobile objects, such as vehicles, two-wheeled motor vehicles, bicycles, pedestrians, and the like, moving on the roads.

Figure 1:
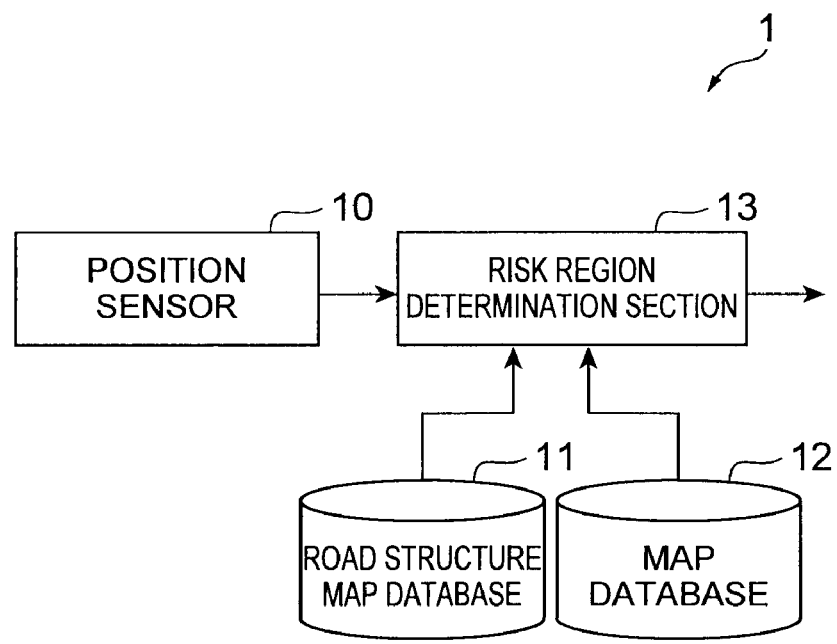
FIG. 1 is a configuration diagram of a risk region determination device according to a first embodiment.
Figure 2:
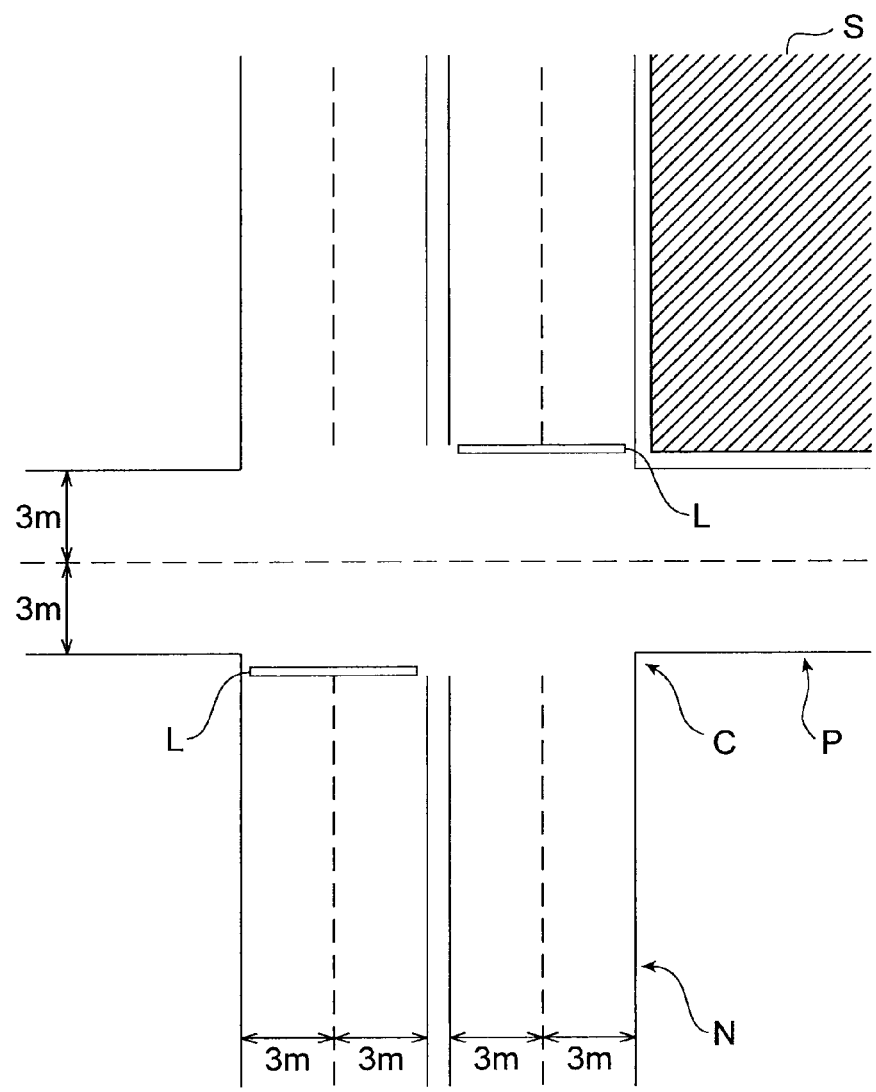
FIG. 2 is an explanatory view of a road structure parameter stored in a road structure map database.

A risk region determination device 1 according to the first embodiment will be described with reference to FIGS. 1 and 2. FIG. 1 is a configuration diagram of the risk region determination device according to the first embodiment. FIG. 2 is an explanatory view of a road structure parameter which is stored in a road structure map database.

The risk region determination device 1 determines whether or not a predefined traffic rule in each region is highly likely to be observed, and when the predefined traffic rule is unlikely to be observed, sets the relevant region as a risk region. In particular, the risk region determination device 1 determines whether a traffic rule which is highly likely to be observed conforms to the predefined traffic rule or not on the basis of a road structure. To this end, the risk region determination device 1 includes a position sensor 10, a road structure map database 11, a map database 12, and a risk region determination section 13. The road structure map database 11, the map database 12, and the risk region determination section 13 are provided in an ECU [Electronic Control Unit] including a CPU [Central Processing Unit], a ROM [Read Only Memory], a RAM [Random Access Memory], and the like.

In the risk region determination device 1 according to the first embodiment, the road structure map database 11, the map database 12, and the risk region determination section 13 correspond to a traffic rule acquisition unit described in the appended claims, and the risk region determination section 13 corresponds to a region acquisition unit described in the appended claims.

The position sensor 10 is a sensor detecting the current position of the host-vehicle. The position sensor 10 includes, for example, a GPS receiver and the like. When a car navigation device is mounted on the host-vehicle, the current position may be acquired from the car navigation device serving as a position sensor.

The road structure map database 11 is a database that stores the values of respective parameters representing a road structure for each road region (for example, intersection or junction). The parameters representing the road structure are, for example, the number of lanes, road width (lane width), speed limit, road gradient, and information (size and the like) of shielding object of each road. The shielding object is a building or wall that obstructs the field of vision when viewing a road side intersecting (joining with) a traveling road from a driver of a vehicle or an obstacle detection sensor.

In the example of FIG. 2, there is shown an intersection C where a one-way, two-lane (two-way, four-lane) road N and a one-way, one-lane (two-way, two-lane) road P intersect each other and where no traffic lights exist. The one-way, two-lane road N has each lane width of 3 m (the road width of the entire road is 12 m). The one-way, one-lane road P has each lane width of 3 m (the road width of the entire road is 6 m). All roads have no road gradient. At one point of the intersection C, a shielding object S exists. At this intersection C, as will be apparent from the fact that stop lines L and L are provided on the one-way, two-lane road N, under a predefined traffic rule, the one-way, two-lane road N is a non-priority road, and the one-way, one-lane road P is a priority road.

The map database 12 is a database that stores road map information. In particular, the road map information also includes a traffic rule which is predefined by a sign or the like. Basically, the predefined traffic rule should be observed.

The risk region determination section 13 is a processing section that determines whether a road region is a risk region where a predefined traffic rule in the relevant region is highly likely to be violated or not on the basis of the road structure parameters which are stored in the road structure map database 11 and the traffic rule which is stored in the map database 12. In particular, when the host-vehicle enters a predetermined region including an intersection, a junction, or the like where a priority road and a non-priority road intersect each other and where no traffic lights exist, this processing may be performed.

Specifically, if the current position is acquired from the position sensor 10, the risk region determination section 13 acquires the values of the road structure parameters of a region around the current position from the road structure map database 11, and acquires a predefined traffic rule (a traffic rule representing the relationship between a priority road and a non-priority road) of the region around the current position from the map database 12.

The risk region determination section 13 places priority to each road on the basis of the values of the respective road structure parameters, and places priority to each road in accordance with the predefined traffic rule. With regard to the prioritization, high priority is placed to a road on which priority travel is possible.

In the case of a predefined traffic rule, a priority road has high priority, and a non-priority road has low priority. However, in terms of the road structure, when the road width of the non-priority road is wider than that of the priority road, a vehicle that is traveling on the non-priority road tends to preferentially pass through an intersection or the like, and a vehicle that is traveling on the priority road tends to stop at the intersection or the like. Further, even if the road width of the non-priority road is narrower than that of the priority road, when the non-priority road has a road gradient, a vehicle that is traveling down on the non-priority road tends to pass through an intersection or the like without stopping, so in terms of safety, a vehicle that is traveling on the priority road desirably stops or reduces speed. If a shielding object that obstructs the field of vision exists when viewing the non-priority road side from a vehicle which is traveling on the priority road, it is difficult to confirm whether a vehicle on the non-priority road stops or not from the side of a vehicle that is traveling on the priority road, so in terms of safety, a vehicle that is traveling on the priority road desirably stops or reduce speed.

In the case of prioritization of each road according to a predefined traffic rule, high priority is put to the priority road, and low priority is put to the non-priority road. Meanwhile, at the time of prioritization of each road based on the values of the respective road structure parameters, basically, the road width of the priority road is compared with the road width of the non-priority road by using the parameter of the road width, then, high priority is put to a road having a wide road width, and low priority is put to a road having a narrow road width. Instead of simple comparison of the road width, even though the non-priority road is wide, only when it is wider by a predetermined amount, high priority may be put to the non-priority road. Alternatively, comparison may be made regarding the number of lanes, instead of the road width, and high priority may be put to a road having a large number of lanes. Further, it is determined whether or not a road gradient exists by using the parameter of the road gradient, and when a road gradient exists, high priority is put to a descending road. In addition, it is determined whether a shielding object exists or not by using the parameter of the shielding object, and when a shielding object exists, the priority of a road with the shielding object is regulated to a lower priority. Note that, while just an example of prioritization according to the parameters of the road structure is described, prioritization may be performed by using other parameters of the road structure.

The risk region determination section 13 compares the prioritization according to each road structure parameter with the prioritization according to the predefined traffic rule, and determines whether or not both conform to each other. In the case of conformity, the risk region determination section 13 determines that the relevant region is not a risk region (a region where the predefined traffic rule is highly likely to be observed). Meanwhile, in the case of unconformity, the risk region determination section 13 determines that the relevant region is a risk region (a region where the predefined traffic rule is highly likely to be violated).

Figure 3:
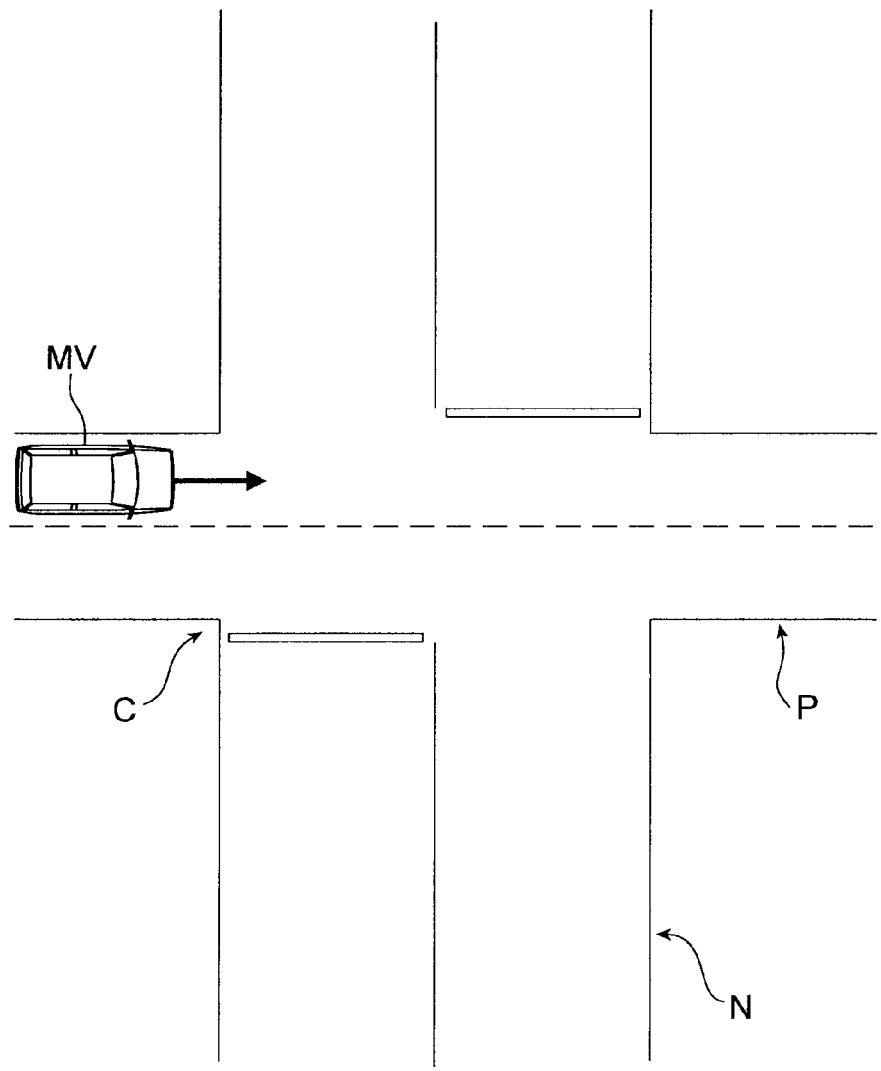
FIG. 3 shows an example of an intersection where the road width of a priority road is narrower than that of a non-priority road.

FIG. 3 shows an intersection C where a priority road P and a non-priority road N intersect each other and where no traffic lights exist, and an example where the road width of the non-priority road N is wider than the road width of the priority road P. With regard to the intersection C, in the case of prioritization of each road according to a predefined traffic rule, high priority is put to the priority road P, and low priority is put to the non-priority road N. Meanwhile, in the case of prioritization of each road based on the parameter of the road width, high priority is put to the road N having a wide road width, and low priority is put to the road P having a narrow road width. Accordingly, at this intersection C, the prioritization according to the road structure parameter does not conform to the prioritization according to the predefined traffic rule, so it is determined that the relevant region is a risk region.

Figure 4:
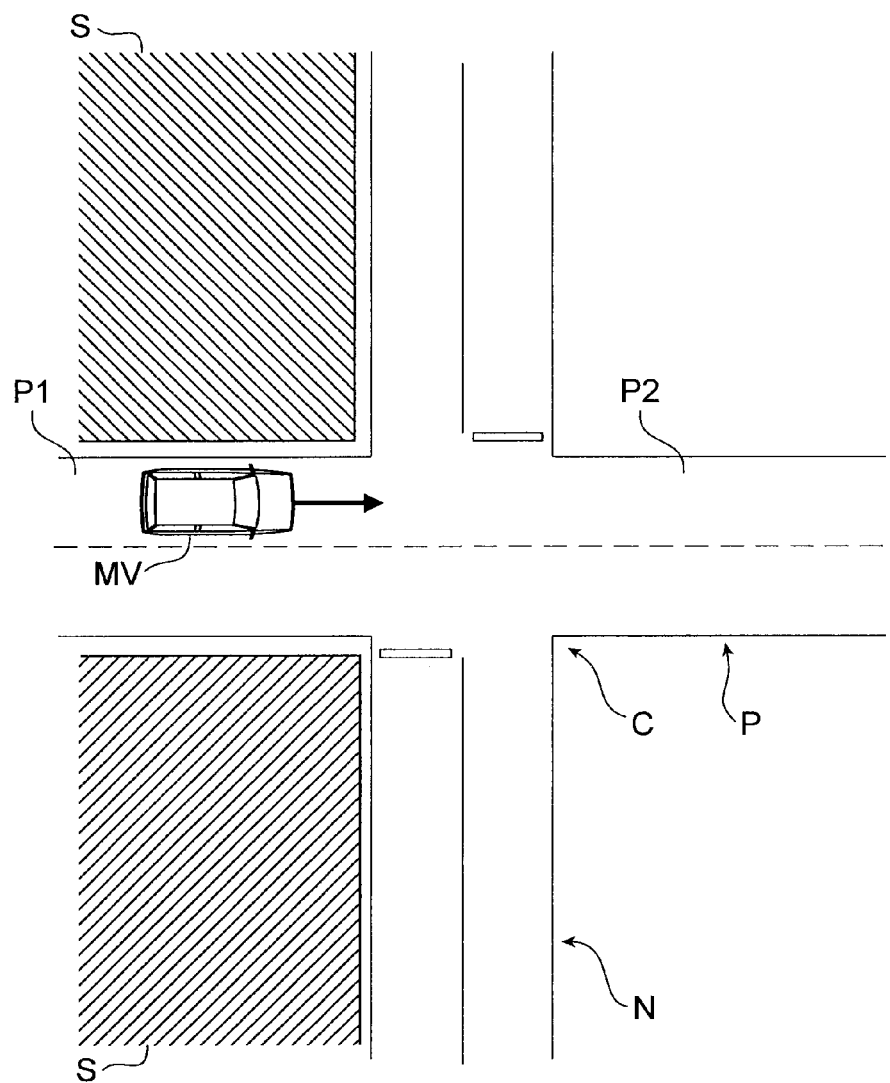
FIG. 4 shows an example of an intersection where a shielding object exists around an exit of a priority road.

FIG. 4 shows an intersection C where a priority road P and a non-priority road N intersect each other and where no traffic lights exist, and an example where shielding objects S and S exist on both sides of the one-way priority road P1 toward the intersection C. With regard to this intersection C, in the case of prioritization of each road according to a predefined traffic rule, high priority is put to the priority road P, and low priority is put to the non-priority road N. Meanwhile, in the case of prioritization of each road based on the parameter of the road width, since both roads have the same road width, high priority is put to the priority road P, and low priority is put to the non-priority road N. Further, in the case of prioritization of each road based on the parameter of the shielding object, since the shielding objects S and S exist on both sides of the one-way priority road P1, lowest priority is put to the one-side priority road P1. That is, the other-way priority road P2 has highest priority, and the non-priority road N has second highest priority, and the one-way priority road P1 has lowest priority. Accordingly, at this intersection C, the prioritization according to the road structure parameter does not conform to the prioritization according to the predefined traffic rule, so it is determined that the relevant region is a risk region.

Figure 5:
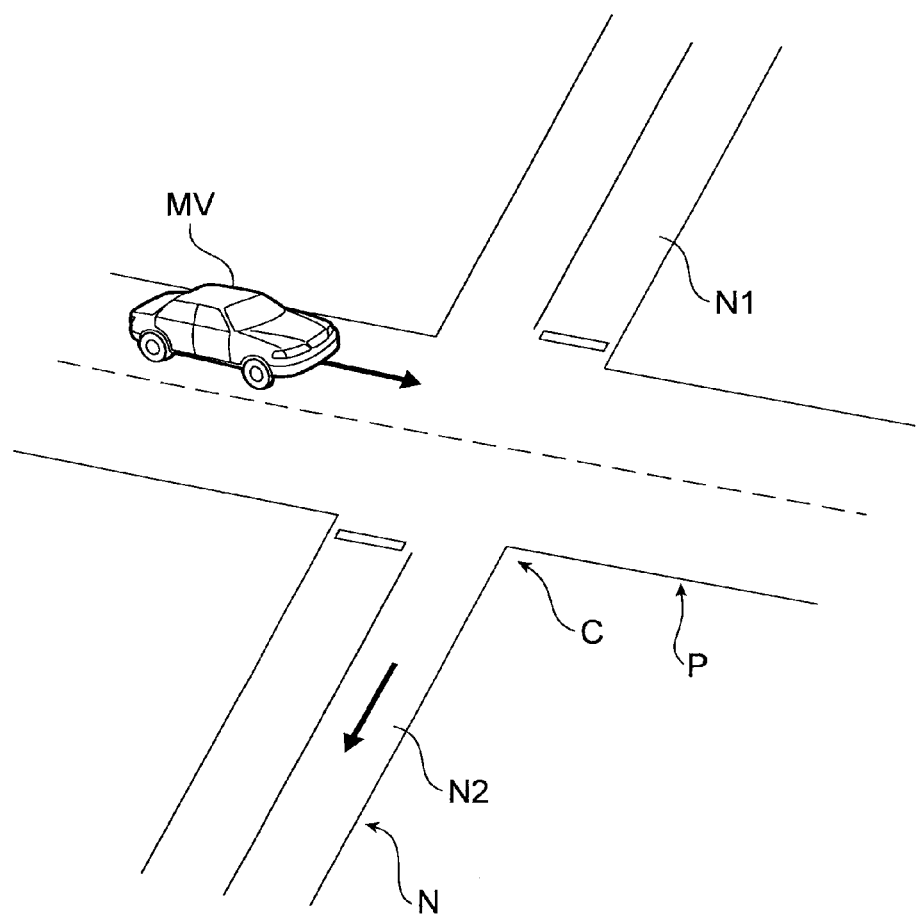
FIG. 5 shows an example of an intersection where a non-priority road has a gradient.

FIG. 5 shows an intersection C where a priority road P and a non-priority road N intersect each other and where no traffic lights exist, and an example where the non-priority road N has a road gradient. With regard to this intersection C, in the case of prioritization of each road according to a predefined traffic rule, high priority is put to the priority road P, and low priority is put to the non-priority road N. Meanwhile, in the case of prioritization of each road based on the parameter of the road width, high priority is put to the road P having a wide road width, and low priority is put to the road N having a narrow road width. Further, in the case of prioritization of each road based on the parameter of the road gradient, since the non-priority road N1 toward the intersection C is a descending road, highest priority is put to the descending non-priority road N1. That is, the descending non-priority road N1 has highest priority, the priority road P has second largest priority, and the ascending non-priority road N2 has lowest priority. Accordingly, at this intersection C, the prioritization according to the road structure parameter does not conform to the prioritization according to the predefined traffic rule, so it is determined that the relevant region is a risk region.

Figure 6:
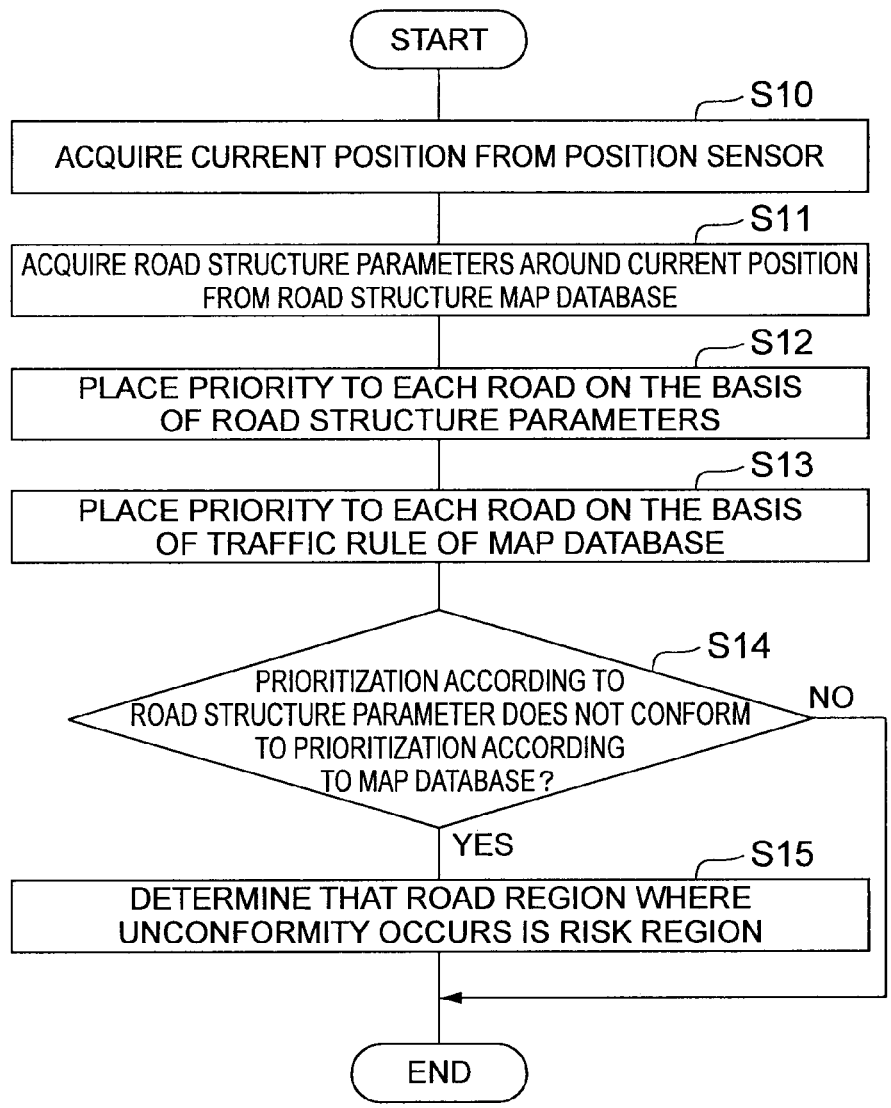
FIG. 6 is a flowchart showing the flow of processing in a risk region determination section of FIG. 1.

The operation of the risk region determination device 1 will be described with reference to FIGS. 1 and 2. In particular, processing in the risk region determination section 13 will be described with reference to a flowchart of FIG. 6. FIG. 6 is a flowchart showing the flow of processing in the risk region determination section of FIG. 1.

The position sensor 10 detects the current position of the host-vehicle at each predetermined time interval. The risk region determination section 13 acquires the current position from the position sensor 10 (S10).

Next, the risk region determination section 13 acquires various road structure parameters around the current position from the road structure map database 11 (S11). Then, the risk region determination section 13 places priority to each road on the basis of various road structure parameters (S12). Further, the risk region determination section 13 acquires a traffic rule around the current position from the map database 12, and places priority to each road in accordance with the traffic rule (S13).

The risk region determination section 13 determines whether or not the prioritization according to the road structure parameter does not conform to the prioritization according to the traffic rule of the map database 12 (S14). When it is determined in S14 to be unconformity, the risk region determination section 13 determines that a road region where unconformity occurs is a risk region (S15), and ends this processing. Meanwhile, when it is determined in S14 to be conformity, the risk region determination section 13 ends this processing.

Next, the risk region determination device 1 outputs information regarding the risk region to various driving assist apparatuses or automatic driving apparatuses.

According to this risk region determination device 1, a risk region where a mobile object is highly likely to violate a defined traffic rule in each region is determined, so even though a mobile object around the host-vehicle violates a defined traffic rule, appropriate driving assist can be performed with respect to the host-vehicle on the basis of the risk region, and safety can be improved. In particular, according to the risk region determination device 1, a probability that a defined traffic rule is observed/violated is determined on the basis of the road structure, so determination can be simply made by using existing information.

Figure 7:
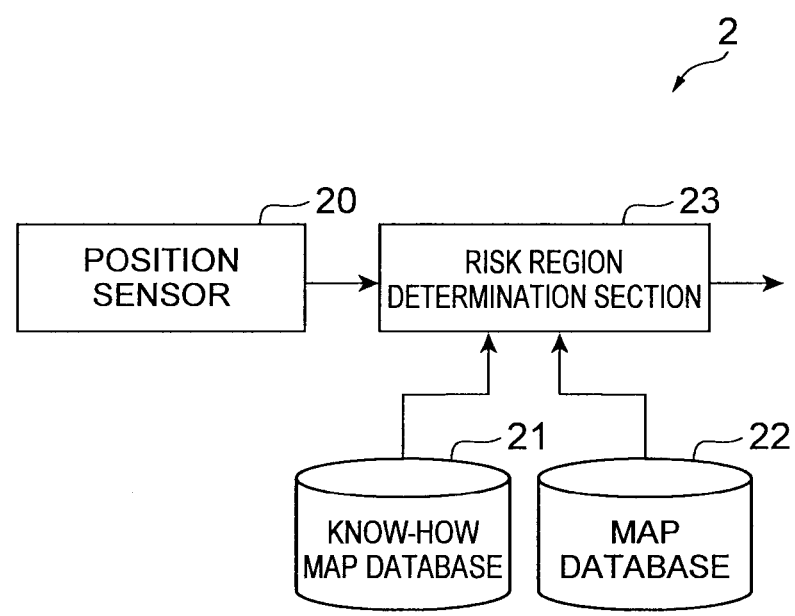
FIG. 7 is a configuration diagram of a risk region determination device according to a second embodiment.
Figure 8:
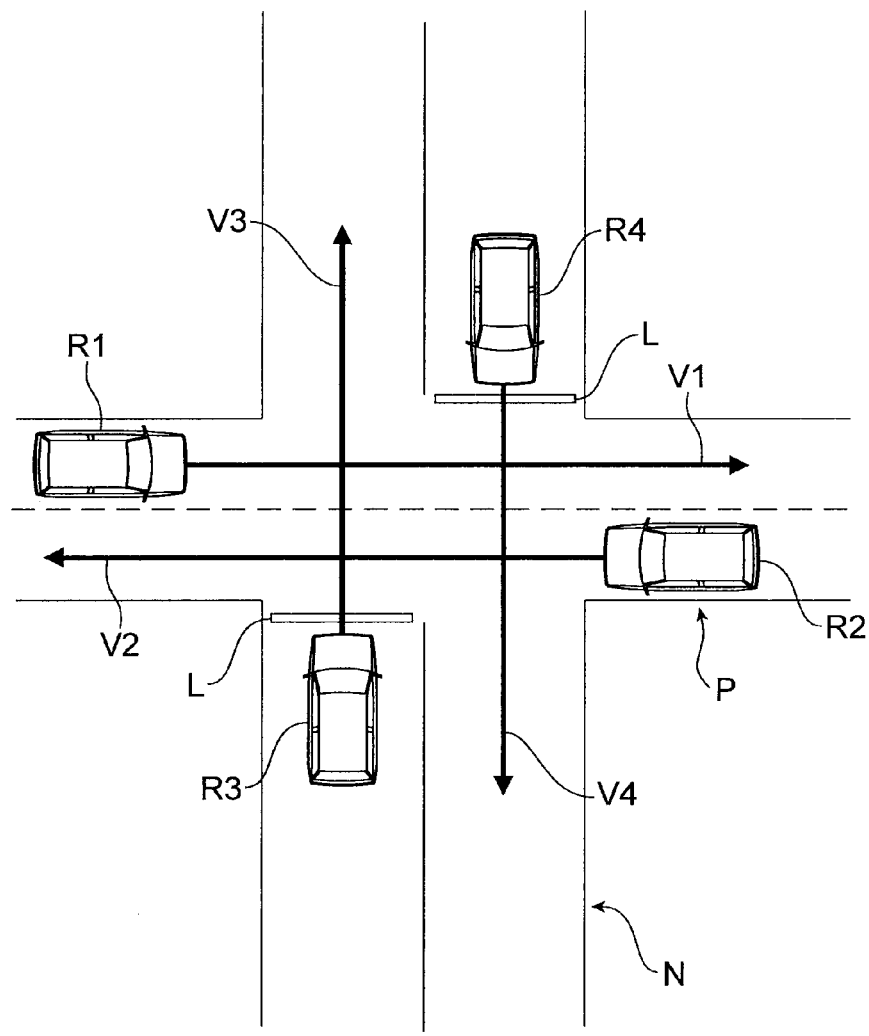
FIG. 8 is an explanatory view of behavior information of a vehicle which is stored in a know-how map database.

A risk region determination device 2 according to the second embodiment will be described with reference to FIGS. 7 and 8. FIG. 7 is a configuration diagram of the risk region determination device according to the second embodiment. FIG. 8 is an explanatory view of behavior information of a vehicle which is stored in a know-how map database.

The risk region determination device 2 determines whether or not a predefined traffic rule is highly likely to be observed in each region, and when it is unlikely to be observed, determines that the relevant region is a risk region. In particular, the risk region determination device 2 determines whether or not a traffic rule that is highly likely to be observed on the basis of the actual traffic conditions conforms to a predefined traffic rule. To this end, the risk region determination device 2 includes a position sensor 20, a know-how map database 21, a map database 22, and a risk region determination section 23. The know-how map database 21, the map database 22, and the risk region determination section 23 are provided in an ECU including a CPU, a ROM, a RAM, and the like. Note that the position sensor 20 and the map database 22 in the risk region determination device 2 are the same as the position sensor 10 and the map database 12 in the risk region determination device 1 according to the first embodiment, respectively, and thus descriptions thereof will be omitted.

In the risk region determination device 2 according to the second embodiment, the know-how map database 21, the map database 22, and the risk region determination section 23 correspond to a traffic rule acquisition unit described in the appended claims, and the risk region determination section 23 corresponds to a region acquisition unit described in the appended claims.

The know-how map database 21 is a database that stores actual behavior information of a vehicle (including a bicycle) in each road region. The behavior information includes, for example, an average travel speed on a road, a stop ratio before entrance to the intersection, and violation information (reverse travel on one-way road). The behavior information is generated on the basis of the survey result on many vehicles which is traveling in each region. Accordingly, the know-how map database 21 stores information according to the actual traffic conditions in each region. Further, in order to obtain information more suitable for the actual traffic conditions, the survey may be performed for each time zone, each day of the week, or the like, and vehicle behavior information may be stored in association with information regarding the time zone, the day of the week, or the like.

A survey of vehicle behaviors may be read by a sensor provided at each intersection and may be made as a database, or a manual survey may be made as a database. In the case of the manual survey, accident cases and behavior information deviated from the traffic rules are desirably made as a database. Further, behavior information acquired by a sensor mounted on a vehicle may be accumulated in the ECU of the host-vehicle, or behavior information acquired by a vehicle with a sensor mounted thereon may be shared through a network. In addition, a database may be made by the combination of those methods. Update information of the database may be provided through media, such as CD or the like, a wired communication network provided at a parking lot or the like, or wireless communication, such as road-to-vehicle communication, or may be provided through broadcasting.

In the example of FIG. 8, there is shown an intersection C where a priority road P and a non-priority road N intersect each other and where no traffic lights exist. In the case of the priority road P, the average speed V1 and the stop ratio R1 on the one-way travel lane are 40 km/h and 10%, respectively, and the average speed V2 and the stop ratio R2 on the other-way travel lane are 38 km/h and 20%, respectively. In the case of the non-priority road N, the average speed V3 and the stop ratio R3 on the one-way travel lane is 20 km/h and 80%, respectively, and the average speed V4 and the stop ratio R4 on the other-way travel lane are 15 km/h and 95%, respectively.

The risk region determination section 23 is a processing section that determines whether a road region is a risk region where a predefined traffic rule in the relevant region is highly likely to be violated or not on the basis of vehicle behavior information stored in the know-how map database 21 and the predefined traffic rule stored in the map database 22. In particular, when the host-vehicle enters a predetermined region including an intersection, a junction, or the like where a priority road and a non-priority road intersect each other and where no traffic lights exist, this processing may be performed.

Specifically, when the current position is acquired from the position sensor 20, the risk region determination section 23 acquires vehicle behavior information around the current position from the know-how map database 21, and acquires a predefined traffic rule (a traffic rule representing the relationship (also including one-way traffic information) between the priority road and the non-priority road) in a region around the current position from the map database 22.

Next, the risk region determination section 23 places priority to each road on the basis of the vehicle behavior information, and places priority to each road in accordance with the predefined traffic rule.

For example, with the actual traffic conditions, it can be predicted that a vehicle on a road with a high average vehicle speed is unlikely to reduce speed at an intersection or the like, so a vehicle on the relevant road preferentially passes through the intersection or the like more than other vehicles on another road. Further, a road with a low stop ratio is predicted that a vehicle is unlikely to stop at the intersection or the like, so a vehicle on the relevant road preferentially passes through the intersection or the like more than other vehicles on another road. When there are many vehicles (violating vehicles) that reverse travel on a one-way road at a time zone, if a vehicle enters the one-way road, safety is deteriorated, so even though a vehicle can enter the one-way road, entrance is desirably prohibited at that time zone.

In the case of prioritization of each road according to the predefined traffic rule, priority is given in the same manner as the first embodiment. Meanwhile, in the case of prioritization of each road based on the vehicle behavior information, basically, the average speed is used, such that high priority is put to a road with a high average speed, and low priority is put to a road with a low average speed. Simultaneously, the stop ratio is used, such that high priority is put to a road with a low stop ratio, and low priority is put to a road with a high stop ratio. Note that determination may be made with the weighted values of the average speed and the stop ratio as one parameter. Alternatively, determination may be made by using either the average speed or the stop ratio. Further, reverse travel information on a one-way road is used to determinate whether or not there are many reverse traveling vehicles on the one-way road, and when there are many reverse traveling vehicles, the entrance to the relevant road is prohibited. While an example of prioritization according to the vehicle behavior information is described, prioritization may be made by using other kinds of vehicle behavior information.

The risk region determination section 23 compares the prioritization according to the vehicle behavior information with the prioritization according to the predefined traffic rule, and determines whether or not both conform to each other. In the case of conformity, the risk region determination section 23 determines that the relevant region is not a risk region. Meanwhile, in the case of unconformity, the risk region determination section 13 determines that the relevant is a risk region.

Figure 9:
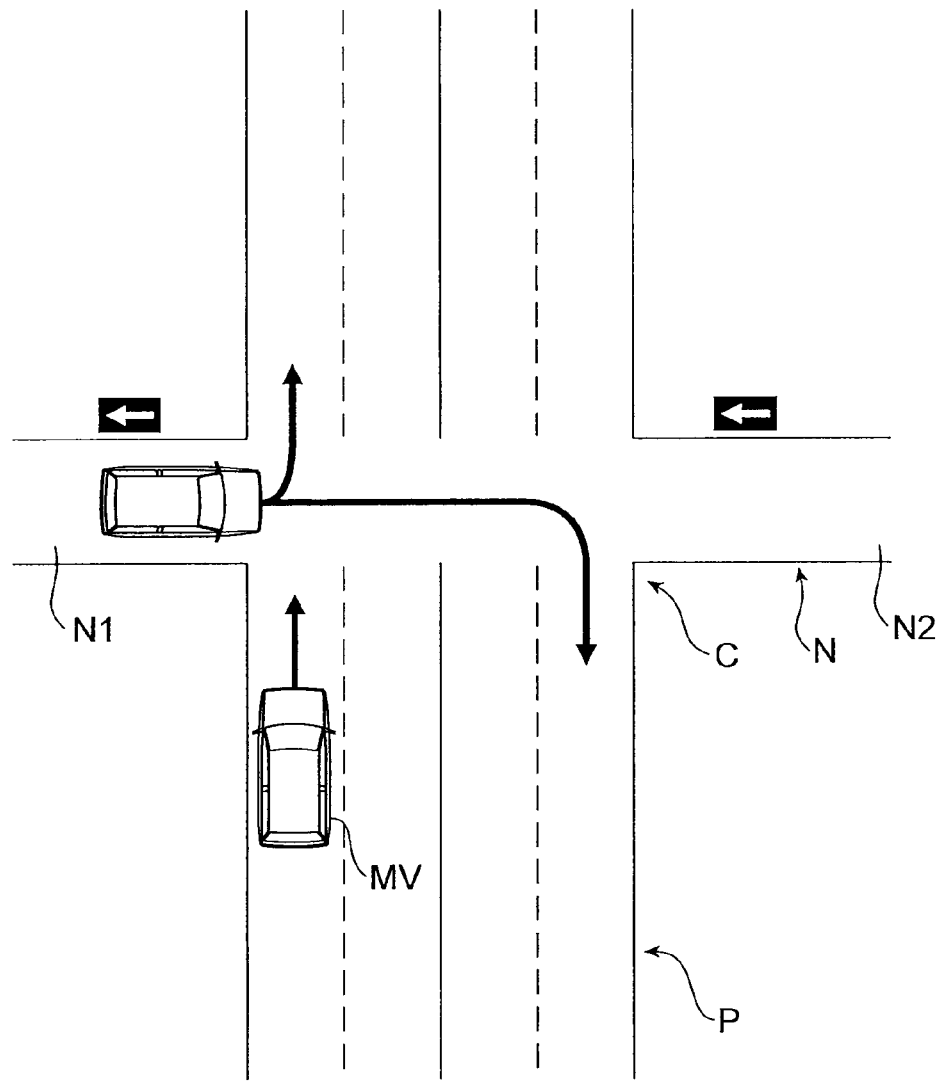
FIG. 9 shows an example of an intersection of a one-way road on which a reverse traveling vehicle appears frequently.

FIG. 9 shows an intersection C where a priority road P and a non-priority road N intersect each other and where no traffic lights exist, and an example where the non-priority road N is a one-way road. With regard to this intersection C, in the case of prioritization of each road according to a predefined traffic rule, high priority is put to the priority road P, and low priority is put to the non-priority road N. Meanwhile, in the case of prioritization of each road based on the average speed or stop ratio, high priority is put to the priority road P with a high average speed and a low stop ratio, and low priority is put to the non-priority road N. Further, in the case of prioritization of each road based on violation information regarding one-way traffic, on the basis of violation information that there are many vehicles which reverse travel on a one-way road N1 (a road on which entrance from the priority road P is permitted, and entrance to the priority road P is prohibited) and enter the priority road P at rush hour, the entrance from the priority road P to the one-way road N1 at this time zone is prohibited (lowest priority).

Figure 10:
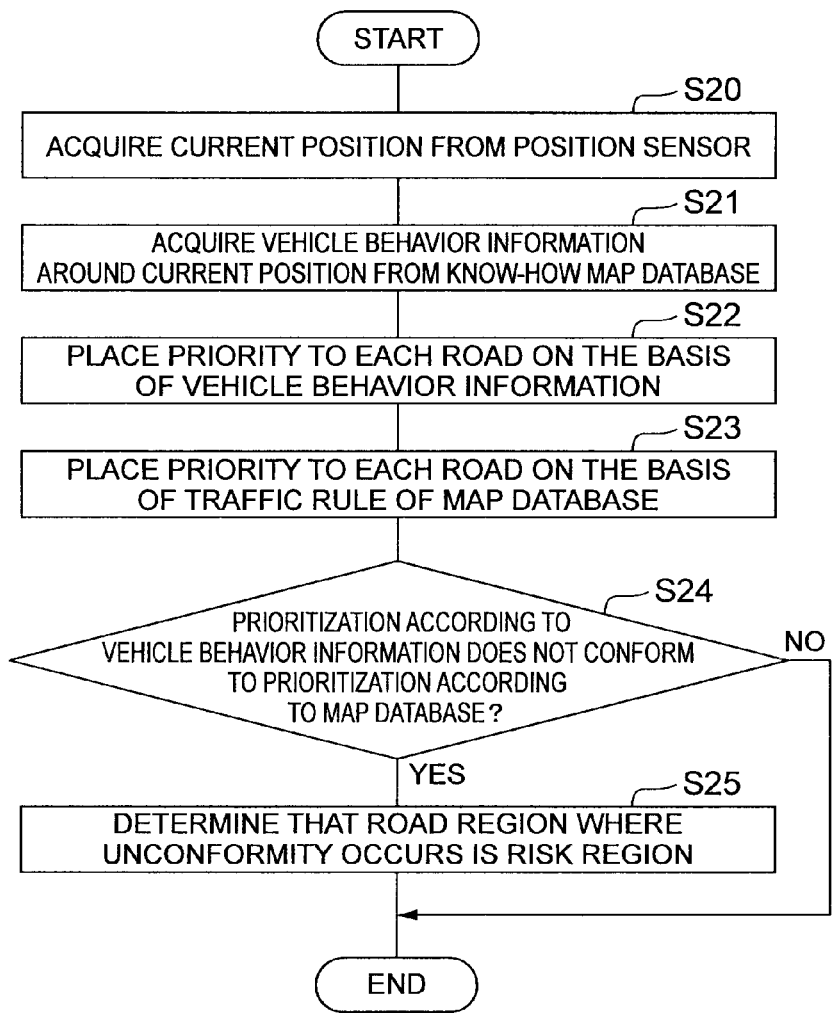
FIG. 10 is a flowchart showing the flow of processing in a risk region determination section of FIG. 7.

The operation of the risk region determination device 2 will be described with reference to FIGS. 7 and 8. In particular, processing in the risk region determination section 23 will be described with reference to a flowchart of FIG. 10. FIG. 10 is a flowchart showing the flow of processing in the risk region determination section of FIG. 7.

The position sensor 20 detects the current position of the host-vehicle at each predetermined time interval. The risk region determination section 23 acquires the current position from the position sensor 20 (S20).

Next, the risk region determination section 23 acquires vehicle behavior information the current position from the know-how map database 21 (S21). Then, the risk region determination section 23 places priority to each road on the basis of the vehicle behavior information (S22). Further, the risk region determination section 23 acquires a traffic rule around the current position from the map database 22, and places priority to each road in accordance with the traffic rule (S23).

The risk region determination section 23 determines whether or not the prioritization according to the vehicle behavior information does not conform to the prioritization by the map database 22 (S24). When it is determined in S24 to be inconformity, the risk region determination section 23 determines that a road region where inconformity occurs is a risk region (S25), and ends this processing. Meanwhile, when it is determined in S24 to be conformity, the risk region determination section 23 ends this processing.

Next, the risk region determination device 2 outputs information regarding the risk region to various driving assist apparatuses or automatic driving apparatuses.

According to this risk region determination device 2, a risk region where a mobile object is highly likely to violate a defined traffic rule in each region is determined, so even though a mobile object around the host-vehicle violates a defined traffic rule, appropriate driving assist can be performed with respect to the host-vehicle on the basis of the risk region, and safety can be improved. In particular, according to the risk region determination device 2, a probability that a defined traffic rule is observed/violated is determined on the basis of actual vehicle behavior information in each region, so accurate determination according to the actual traffic conditions can be made.

Figure 11:
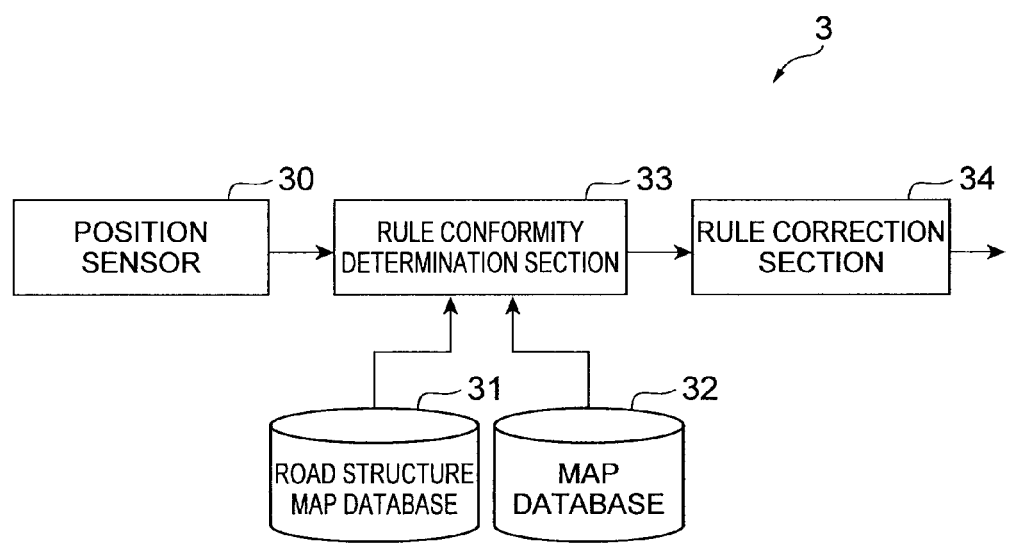
FIG. 11 is a configuration diagram of a rule correction device according to the first embodiment.

A rule correction device 3 according to the first embodiment will be described with reference to FIGS. 11 and 2. FIG. 11 is a configuration diagram of a rule correction device according to the first embodiment.

The rule correction device 3 determines whether or not a predefined traffic rule is highly likely to be observed in each region, and when a traffic rule is unlikely to be observed, corrects the relevant traffic rule. In particular, the rule correction device 3 corrects a traffic rule in accordance with a traffic rule which is highly likely to be observed based on the road structure. To this end, the rule correction device 3 includes a position sensor 30, a road structure map database 31, a map database 32, a rule conformity determination section 33, and a rule correction section 34. The road structure map database 31, the map database 32, the rule conformity determination section 33, and the rule correction section 34 are provided in an ECU including a CPU, a ROM, a RAM, and the like. The position sensor 30, the road structure map database 31, and the map database 32 in the rule correction device 3 are the same as the position sensor 10, the road structure map database 11, and the map database 12 in the risk region determination device 1 according to the first embodiment, respectively, and thus descriptions thereof will be omitted.

In the rule correction device 3 according to the first embodiment, the road structure map database 31, the map database 32, the rule conformity determination section 33, and the rule correction section 34 correspond to a traffic rule acquisition unit described in the appended claims, and the rule correction section 34 corresponds to a traffic rule correction unit described in the appended claims.

The rule conformity determination section 33 is a processing section that determines conformity of a traffic rule which is predicted from the road structure and a predefined traffic rule in each region on the basis of the road structure parameters stored in the road structure map database 31 and the traffic rule stored in the map database 32. In particular, when the host-vehicle enters a predetermined region including an intersection, a junction, or the like where a priority road and a non-priority road intersect each other and where no traffic lights exist, this processing may be performed.

Specifically, the rule conformity determination section 33 places priority to each road on the basis of the values of the respective road structure parameters, and places priority to each road in accordance with the predefined traffic rule by the same processing as in the risk region determination section 13 of the risk region determination device 1 according to the first embodiment. Then, the rule conformity determination section 33 compares the prioritization according to the road structure parameters and the prioritization according to the predefined traffic rule, and determines whether or not both conform to each other.

The rule correction section 34 is a processing section that if the rule conformity determination section 33 determines that the prioritization according to the road structure parameters does not conform to the prioritization according to the predefined traffic rule, corrects the traffic rule on the basis of the road structure parameters.

Specifically, in the case of unconformity, the rule correction section 34 corrects the rule (adds a rule) such that the prioritization according to the traffic rule of the map database 32 becomes the prioritization according to the road structure parameters. That is, when the prioritization is made on the basis of the traffic rule stored in the map database 32, the traffic rule stored in the map database 32 is corrected or a new traffic rule is added such that the prioritization according to the traffic rule becomes the prioritization according to the road structure parameter. For example, with regard to the prioritization according to the road structure parameters, when the non-priority road has higher priority than the priority road, a traffic rule regarding stop is added to the priority road side or the traffic rule is corrected a traffic rule in which the relationship between the non-priority road and the priority road is reversed.

A traffic rule on an expected travel path of the host-vehicle may only be corrected. In this case, it is determined whether or not the prioritization according to the predefined traffic rule on the expected travel path of the host-vehicle is lower than the prioritization according to the road structure parameter, and when the prioritization according to the predefined traffic rule is lower than the prioritization according to the road structure parameters, the traffic rule is corrected (a traffic rule is added) such that the prioritization according to the traffic rule of the map database 32 on the expected travel path of the host-vehicle is lower than the prioritization according to the road structure parameters.

Referring to the example of FIG. 3, as described above, at the intersection C, the prioritization according to the road structure parameters does not conform to the prioritization according to the predefined traffic rule. Accordingly, with respect to the priority road P having a road width narrower than the non-priority road N, a traffic rule, such as stop or slow, is added.

Referring to the example of FIG. 4, as described above, at the intersection C, the prioritization according to the road structure parameters does not conform to the prioritization according to the predefined traffic rule. Accordingly, with respect to the priority road P1 having the shielding objects S and S on both sides, a traffic rule, such as stop or slow, is added.

Referring to the example of FIG. 5, as described above, at the intersection C, the prioritization according to the road structure parameters does not conform to the prioritization according to the predefined traffic rule. Accordingly, with respect to the priority road P intersecting the descending non-priority road N1, a traffic rule, such as stop or slow, is added.

Figure 12:
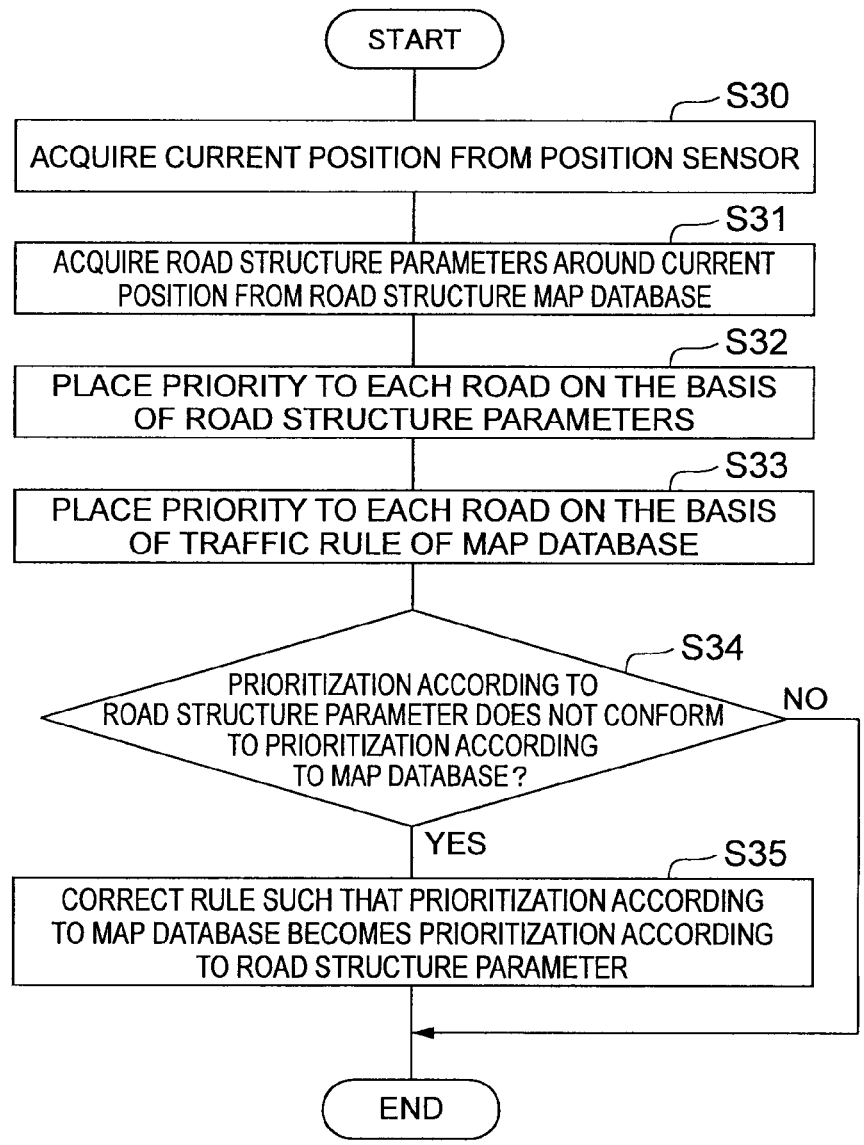
FIG. 12 is a flowchart showing the flow of processing in a rule conformity determination section and a rule correction section of FIG. 11.

The operation of the rule correction device 3 will be described with reference to FIGS. 11 and 2. In particular, processing in the rule conformity determination section 33 and the rule correction section 34 will be described with reference to a flowchart of FIG. 12. FIG. 12 is a flowchart showing the flow of processing in the rule conformity determination section and the rule correction section of FIG. 11.

The position sensor 30 detects the current position of the host-vehicle at each predetermined time interval. The rule conformity determination section 33 acquires the current position from the position sensor 30 (S30).

Next, the rule conformity determination section 33 acquires various road structure parameters around the current position from the road structure map database 31 (S31). Then, the rule conformity determination section 33 places priority to each road on the basis of various road structure parameters (S32). Further, the rule conformity determination section 33 acquires a traffic rule around the current position from the map database 32, and places priority to each road in accordance with the traffic rule (S33).

The rule conformity determination section 33 determines whether or not the prioritization according to the road structure parameters does not conform to the prioritization by the map database 32 (S34). When it is determined in S34 to be unconformity, the rule correction section 34 corrects the rule in the map database 32 such that the prioritization by the map database 32 becomes the prioritization according to the road structure parameters (S35), and ends this processing. Meanwhile, if it is determined in S34 to be conformity, the rule correction section 34 ends this processing, without correcting the rule.

Various driving assist apparatuses or automatic driving apparatuses perform various kinds of processing by using the map database 32.

According to this rule correction device 3, when a mobile object is unlikely to observe a defined traffic rule in each region, the traffic rule is corrected, so even though a mobile object around the host-vehicle violates the defined traffic rule, appropriate driving assist can be performed with respect to the host-vehicle on the basis of the corrected traffic rule, and safety can be improved. In particular, according to the rule correction device 3, a probability that a defined traffic rule is observed/violated is determined on the basis of the road structure, and the rule is corrected, so determination and rule correction can be simply made by using existing information.

Rule correction may be made on the basis of the road structure such that when a lane on which the host-vehicle is traveling is stop, stop is released. However, as the result of correction, when the travel state of the host-vehicle is against the intrinsic traffic rule, desirably, the traffic rule is not corrected.

Figure 13:
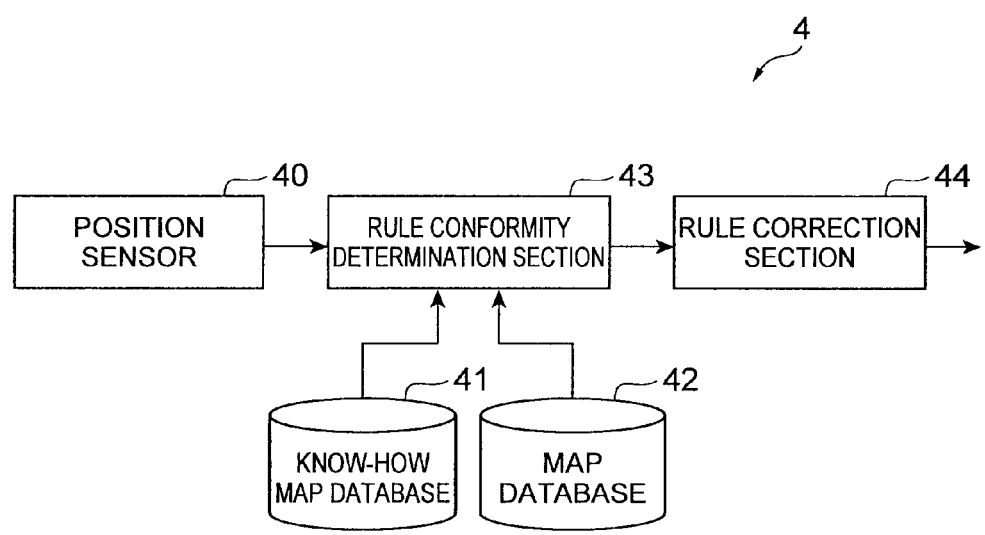
FIG. 13 is a configuration diagram of a rule correction device according to the second embodiment.

A rule correction device 4 according to the second embodiment will be described with reference to FIGS. 13 and 8. FIG. 13 is a configuration diagram of a rule correction device according to the second embodiment.

The rule correction device 4 determines whether or not a predefined traffic rule is highly likely to be observed in each region, and when it is unlikely to be observed, corrects the traffic rule. In particular, the rule correction device 4 corrects the traffic rule in accordance with a traffic rule which is highly likely to be observed based on the actual traffic conditions. To this end, the rule correction device 4 includes a position sensor 40, a know-how map database 41, a map database 42, a rule conformity determination section 43, and a rule correction section 44. The know-how map database 41, the map database 42, the rule conformity determination section 43, and the rule correction section 44 are provided in an ECU including a CPU, a ROM, a RAM, and the like. The position sensor 40, the know-how map database 41, and the map database 42 in the rule correction device 4 are the same as the position sensor 20, the know-how map database 21, and the map database 22 in the risk region determination device 2 according to the second embodiment, and thus descriptions thereof will be omitted.

In the rule correction device 4 according to the second embodiment, the know-how map database 41, the map database 42, the rule conformity determination section 43, and the rule correction section 44 correspond to a traffic rule acquisition unit described in the appended claims, and the rule correction section 44 corresponds to a traffic rule correction unit described in the appended claims.

The rule conformity determination section 43 is a processing section that determines whether a predefined traffic rule is highly likely to be observed in each region or not on the basis of vehicle behavior information stored in the know-how map database 41 and a predefined traffic rule stored in the map database 42. In particular, when the host-vehicle enters a predetermined region including an intersection, a junction, or the like where a priority road and a non-priority road intersect each other and where no traffic lights exist, this processing may be performed.

Specifically, the rule conformity determination section 43 places priority to each road on the basis of the vehicle behavior information and places priority to each road in accordance with the predefined traffic rule by the same processing as in the risk region determination section 23 of the risk region determination device 2 according to the second embodiment. Then, the rule conformity determination section 43 compares the prioritization according to the vehicle behavior information with the prioritization according to the predefined traffic rule, and determines whether or not both conform to each other.

The rule correction section 44 is a processing section that if the rule conformity determination section 43 determines that the prioritization according to the vehicle behavior information does not conform to the prioritization according to the predefined traffic rule, corrects the traffic rule to a traffic rule based on the vehicle behavior information.

Specifically, in the case of unconformity, the rule correction section 44 corrects the rule (adds a rule) such that the prioritization according to the traffic rule of the map database 42 becomes the prioritization according to the vehicle behavior information. That is, when the prioritization is made on the basis of the traffic rule stored in the map database 42, the traffic rule stored in the map database 42 or a new traffic rule is added such that the prioritization according to the traffic rule becomes the prioritization according to the vehicle behavior information. For example, from the vehicle behavior information, there are many vehicles that are reverse traveling at a specific time zone, so when lowest priority is put to the one-way road in order to prohibit entrance, a traffic rule that the entrance to the one-way road is prohibited only at the specific time zone is added.

As described in the rule correction device 3 according to the first embodiment, the traffic rule on the expected travel path of the host-vehicle may only be corrected.

Referring to the example of FIG. 9, as described above, at the intersection C, the prioritization according to the vehicle behavior information does not conform to the prioritization according to the predefined traffic rule. Accordingly, a traffic rule that the entrance to the one-way road N1 is prohibited only at a specific time zone (rush hour) is added.

Figure 14:
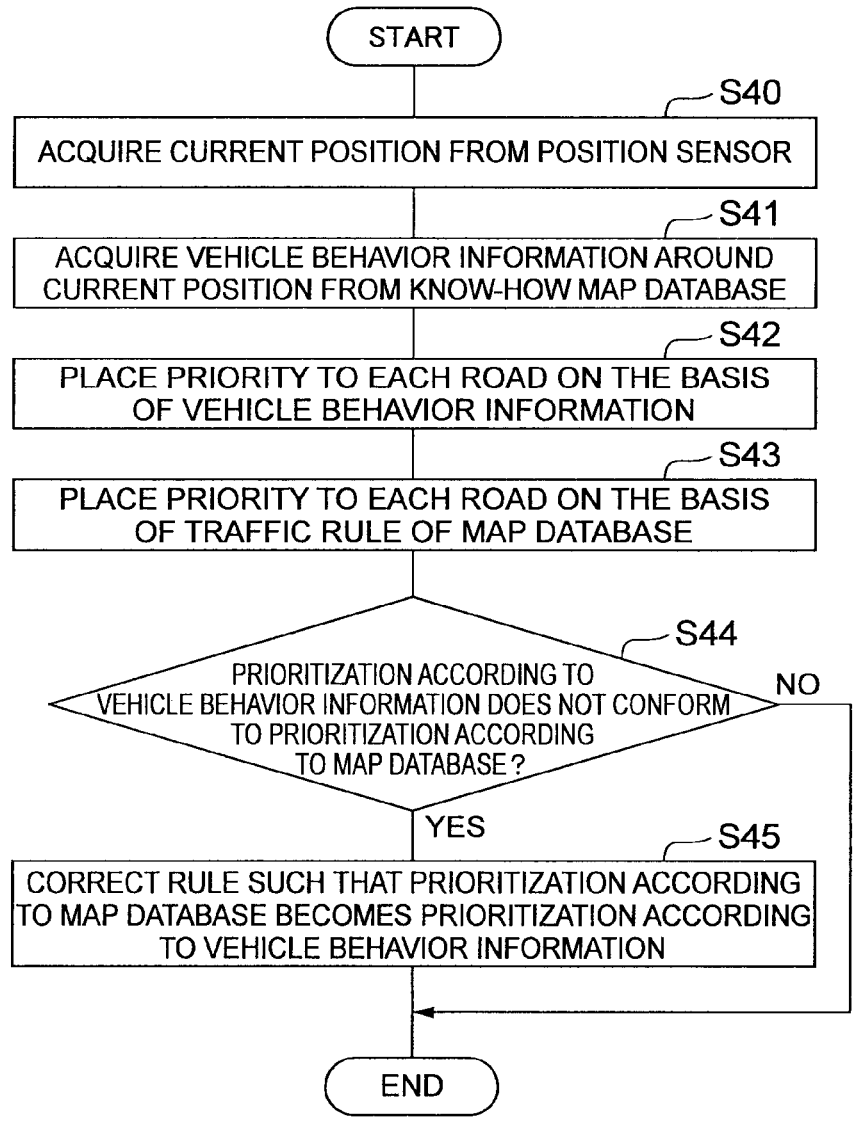
FIG. 14 is a flowchart showing the flow of processing in a rule conformity determination section and a rule correction section of FIG. 13.

The operation of the rule correction device 4 will be described with reference to FIGS. 13 and 8. In particular, processing in the rule conformity determination section 43 and the rule correction section 44 will be described with reference to a flowchart of FIG. 14. FIG. 14 is a flowchart showing the flow of processing in the rule conformity determination section and the rule correction section of FIG. 13.

The position sensor 40 detects the current position of the host-vehicle at each predetermined time interval. The rule conformity determination section 43 acquires the current position from the position sensor 40 (S40).

Next, the rule conformity determination section 43 acquires vehicle behavior information around the current position from the know-how map database 41 (S41). Then, the rule conformity determination section 43 places priority to each road on the basis of the vehicle behavior information (S42). Further, the rule conformity determination section 43 acquires a traffic rule around the current position from the map database 42, and places priority to each road in accordance with the traffic rule (S43).

The rule conformity determination section 43 determines whether or not the prioritization according to the vehicle behavior information does not conform to the prioritization by the map database 42 (S44). When it is determined in S44 to be unconformity, the rule correction section 44 corrects the rule in the map database 42 such that the prioritization by the map database 42 becomes the prioritization according to the vehicle behavior information (S45), and ends this processing.

Meanwhile, when it is determined in S44 to be conformity, the rule correction section 44 ends this processing, without correcting the rule.

Various driving assist apparatuses or automatic driving apparatuses perform various kinds of processing by using the map database 42.

According to this rule correction device 4, when a mobile object is unlikely to observe a defined traffic rule in each region, the traffic rule is corrected, so even though a mobile object around the host-vehicle violates the defined traffic rule, appropriate driving assist can be performed with respect to the host-vehicle on the basis of the corrected traffic rule, and safety can be improved. In particular, according to the rule correction device 4, a probability that a defined traffic rule is observed/violated is determined on the basis of the vehicle behavior information in each region, and the rule is corrected, so accurate determination and rule correction can be performed in accordance with the actual traffic conditions.

Figure 15:
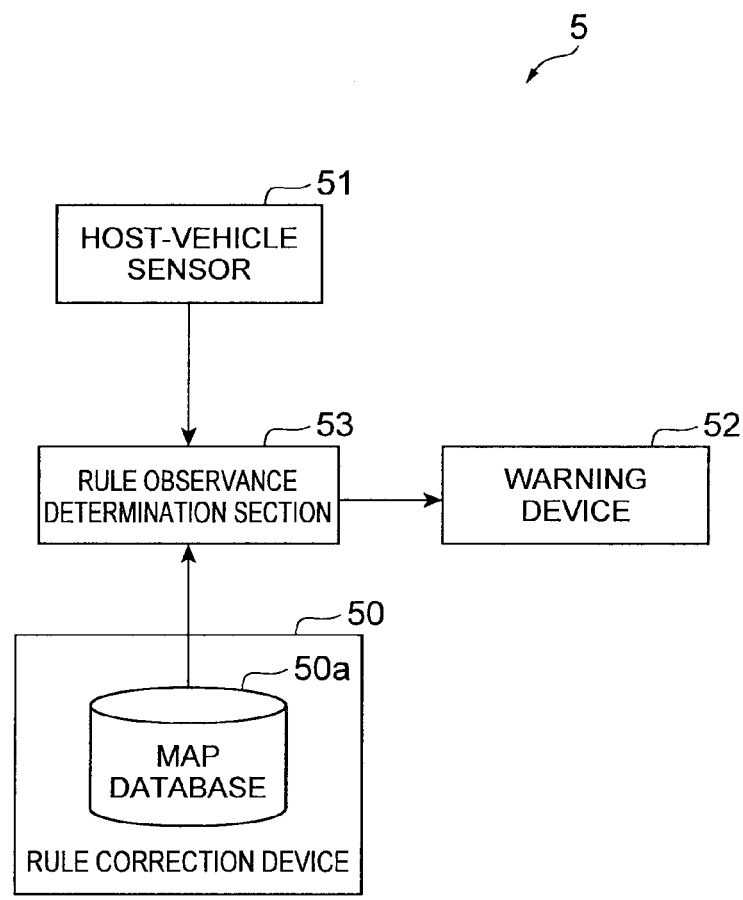
FIG. 15 is a configuration diagram of a driving assist apparatus according to this embodiment.

A driving assist apparatus 5 according to this embodiment will be described with reference to FIG. 15. FIG. 15 is a configuration diagram of a driving assist apparatus according to this embodiment.

The driving assist apparatus 5 gives a warning to a driver when the host-vehicle is highly likely to violate a traffic rule which is highly likely to be actually observed in each region. In particular, the driving assist apparatus 5 determines whether or not the host-vehicle violates a traffic rule which is corrected by the rule correction device (may not be corrected) and stored in the map database. The driving assist apparatus 5 includes a rule correction device 50 (map database 50a), a host-vehicle sensor 51, a warning device 52, and a rule observance determination section 53. Part of the rule correction device 50 and the rule observance determination section 53 are provided in an ECU including a CPU, a ROM, a RAM, and the like.

In the driving assist apparatus 5 according to this embodiment, the rule correction device 50 corresponds to a traffic rule acquisition unit and a traffic rule correction unit described in the appended claims.

With regard to the rule correction device 50, either the rule correction device 3 according to the first embodiment or the rule correction device 4 according to the second embodiment is applied. The rule correction device 50 performs the same processing as in the rule correction device 3 or the rule correction device 4 described above, and provides the map database 50a (corresponding to the map database 32 or the map database 42) subjected to correction processing.

In the case of the map database 50a corresponding to the map database 32, a traffic rule that is corrected (added) so as to make the prioritization based on the road structure in each region is stored. In the case of the map database 50a corresponding to the map database 42, a traffic rule that is corrected (added) so as to make the prioritization based on the actual traffic conditions in each region is stored. When the prioritization based on the road structure or the prioritization based on the actual traffic conditions conforms to the prioritization based on the predefined traffic rule, correction is not performed, and the predefined traffic rule remains as it was. Accordingly, a traffic rule of each region stored in the map database 50a is a traffic rule that is most likely to be observed in each region.

The host-vehicle sensor 51 is a sensor that detects various travel states of the host-vehicle. The travel states are, for example, the current position, vehicle speed, steering angle, accelerator operation, brake operation, steering operation, blinker operation, and the like.

The warning device 52 is a device that outputs a warning so as to inform that the host-vehicle cannot observe a traffic rule under the current travel state. The warning device 52 outputs a warning sound if a rule observance-impossible signal is received from the rule observance determination section 53, and does not output a warning sound if a rule observance-possible signal is received. Instead of a warning sound, a warning voice, such as "Please stop.", "Please stop, left-turn.", or the like may be output.

The rule observance determination section 53 is a processing section that determines whether or not the host-vehicle can observe a traffic rule stored in the map database 50a in each region, and performs output control of the warning device 52 on the basis of the determination result. In particular, when the host-vehicle enters a predetermined region including an intersection, a junction, or the like where a priority road and a non-priority road intersect each other and where no traffic lights exist, this processing may be performed.

Specifically, the rule observance determination section 53 acquires various travel states of the host-vehicle from the host-vehicle sensor 51, and acquires a traffic rule (a traffic rule which is most likely to be observed) around the current position from the map database 50a.

Next, when a driving operation is carried out within a usual operation range under the current travel state of the host-vehicle, the rule observance determination section 53 determines whether or not a traffic rule of the expected travel path of the host-vehicle (when no expected travel path exists, a road on which the host-vehicle is traveling) can be observed. The usual operation range means such a driving operation, such as acceleration equal to or less than 0.2 G. For example, when at an intersection, there is a traffic rule that the host-vehicle should stop before entering the intersection on a road on which the host-vehicle is traveling, it is determined whether or not the host-vehicle that is traveling at a position away from the intersection by a predetermined distance at a predetermined speed can stop before the intersection when a deceleration operation is carried out to generate deceleration of about 0.2 G When a traffic rule can be observed, the rule observance determination section 53 transmits the rule observance-possible signal to the warning device 52 so as not to output a warning sound. Meanwhile, when a traffic rule cannot be observed, the rule observance determination section 53 transmits the rule observance-impossible signal to the warning device 52 so as to output a warning sound.

In the example of FIG. 3, let us say that the host-vehicle MV is traveling on the priority road P. In this example, the rule is corrected such that the non-priority road N has higher priority than the priority road P, and with regard to the priority road P, a traffic rule, such as stop or slow, is added. Accordingly, even though the host-vehicle MV is traveling on the priority road P, if the host-vehicle MV approaches the intersection C and is put in a travel state where stopping is impossible, a warning sound is output.

In the example of FIG. 4, let us say that the host-vehicle MV is traveling on the priority road P1 which has the shielding objects S and S on both sides. In this example, the rule is corrected such that the priority road P1 has lowest priority, and with regard to the priority road P1, a traffic rule, such as stop or slow, is added. Accordingly, even though the host-vehicle MV is traveling on the priority road P1, if the host-vehicle MV approaches the intersection C and is put in a travel state where stopping is impossible, a warning sound is output.

In the example of FIG. 5, let us say that the host-vehicle MV is traveling on the priority road P. In this example, the rule is corrected such that the descending non-priority road N1 has highest priority, not the priority road P, and with regard to the priority road P, a traffic rule, such as stop or slow, is added. Accordingly, even though the host-vehicle MV is traveling on the priority road P, if the host-vehicle MV approaches the intersection C and is put in a travel state where stopping is impossible, a warning sound is output.

In the example of FIG. 9, let us say that the host-vehicle MV is traveling on the priority road P. In this example, the rule is corrected such that entrance to the one-way road N1 is prohibited at rush hour, and a traffic rule that entrance to the one-way road N1 is prohibited at rush hour is added. Accordingly, even though the host-vehicle MV can turn left and enter the one-way road N1, if the host-vehicle MV operates a left blinker to express his/her intention to turn left, a warning sound is output.

Figure 16:
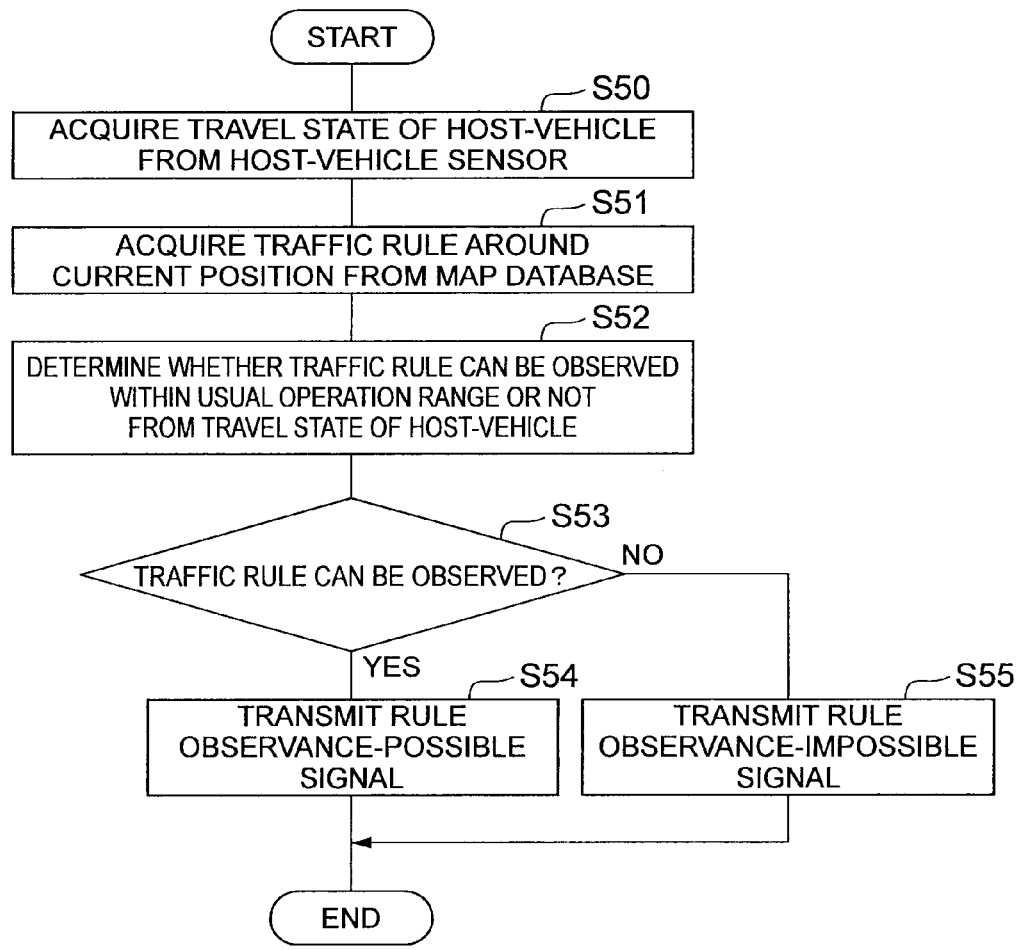
FIG. 16 is a flowchart showing the flow of processing in a rule observance determination section of FIG. 15.

The operation of the driving assist apparatus 5 will be described with reference to FIG. 15. In particular, processing in the rule observance determination section 53 will be described with reference to a flowchart of FIG. 16. FIG. 16 is a flowchart showing the flow of processing in the rule observance determination section of FIG. 15.

The rule correction device 50 carries out the same operation as in either the rule correction device 3 according to the first embodiment or the rule correction device 4 according to the second embodiment to correct the traffic rule of the map database 50a as occasion demands.

The host-vehicle sensor 51 detects various travel states of the host-vehicle at each predetermined time interval. The rule observance determination section 53 acquires the travel states of the host-vehicle (S50). Further, the rule observance determination section 53 acquires the traffic rule around the current position from the map database 50a (S51).

The rule observance determination section 53 determines whether the traffic rule on the expected travel path of the host-vehicle can be observed within the usual operation range or not from the current travel state of the host-vehicle (S52), and discriminates whether the traffic rule can be observed or not from the determination result (S53).

In S53, when the traffic rule can be observed, the rule observance determination section 53 transmits the rule observance-possible signal to the warning device 52. When receiving the rule observance-possible signal, the warning device 52 does not output a warning sound. In S53, when the traffic rule cannot be observed, the rule observance determination section 53 transmits the rule observance-impossible signal to the warning device 52. When receiving the rule observance-impossible signal, the warning device 52 outputs a warning sound. With this warning sound, the driver recognizes the need to stop or the like.

According to this driving assist apparatus 5, when the host-vehicle may not observe a traffic rule which is most likely to be observed in each region, warning is given, so even though a mobile object around the host-vehicle violates the defined traffic rule, safety can be ensured. In particular, according to the driving assist apparatus 5, a traffic rule which is corrected on the basis of the road structure or a traffic rule which is corrected on the basis of the actual traffic conditions is used, so determination can be made by a traffic rule suitable for the conditions of each region.

Figure 17:
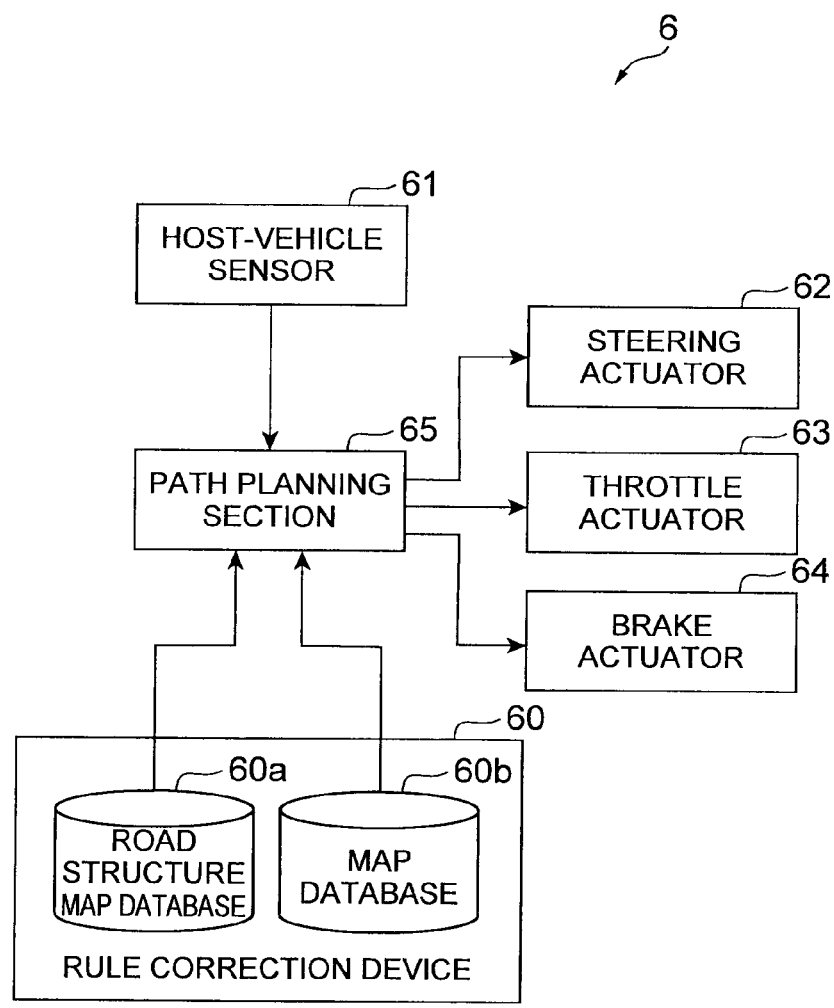
FIG. 17 is a configuration diagram of an automatic driving apparatus according to this embodiment.

An automatic driving apparatus 6 according to this embodiment will be described with reference to FIG. 17. FIG. 17 is a configuration diagram of an automatic driving apparatus according to this embodiment.

The automatic driving apparatus 6 selects a path candidate (target path) from among a plurality of path candidates on the basis of a traffic rule which is highly likely to be actually observed in each region, and performs automatic driving control such that the host-vehicle travels along the target path. In particular, the automatic driving apparatus 6 determines whether or not each path candidate can observe a traffic rule which is corrected by the rule correction device (may not be corrected) and stored in the map database. The automatic driving apparatus 6 includes a rule correction device 60 (a road structure map database 60*a* and a map database 60*b*), a host-vehicle sensor 61, a steering actuator 62, a throttle actuator 63, a brake actuator 64, and a path planning section 65. Part of the rule correction device 60 and the path planning section 65 are provided in an ECU including a CPU, a ROM, a RAM, and the like. The host-vehicle sensor 61 in the automatic driving apparatus 6 is the same as the host-vehicle sensor 51 in the driving assist apparatus 5 according to this embodiment, and a description thereof will be omitted.

In the automatic driving apparatus 6 according to this embodiment, the rule correction device 60 corresponds to a traffic rule acquisition unit and a traffic rule correction unit described in the appended claims, and the path planning section 65 corresponds to a host-vehicle travel path acquisition unit described in the appended claims.

As the rule correction device 60, similarly to the rule correction device 50 of the driving assist apparatus 5 according to this embodiment, either the rule correction device 3 according to the first embodiment or the rule correction device 4 according to the second embodiment is applied.

The steering actuator 62 is an actuator for transmitting a rotational driving force from a motor to a steering mechanism (rack, pinion, column, and the like) through a deceleration mechanism, and for giving steering torque to the steering mechanism. In the steering actuator 62, when a steering control signal is received from the path planning section 65, the motor is driven to rotate and generates steering torque in accordance with the steering control signal.

The throttle actuator 63 is an actuator that adjusts the degree of opening of a throttle valve of an engine. When receiving an engine control signal from the path planning section 65, the throttle actuator 63 operates in accordance with the engine control signal to adjust the degree of opening of the throttle valve.

The brake actuator 64 is a brake actuator that adjusts the brake oil pressure of a wheel cylinder of each wheel. When receiving a brake control signal from the path planning section 65, the brake actuator 64 operates in accordance with the brake control signal to adjust the brake oil pressure of the wheel cylinder.

The path planning section 65 is a processing section that generates a plurality of path candidates, selects an optimal path candidate (target path), which can observe a traffic rule stored in the map database 60*b*, from among a plurality of path candidates, and controls the respective actuators 62, 63, and 64 such that the host-vehicle travels along the target path.

Specifically, the path planning section 65 acquires various travel states of the host-vehicle from the host-vehicle sensor 61. The path planning section 65 also acquires the road structure around the current position from the road structure map database 60*a*, and acquires map information around the current position from the map database 60*b*. Then, the path planning section 65 generates a plurality of path candidates for travel toward a destination on the basis of the current travel state of the host-vehicle and the road structure or map information. With regard to the task candidate generation method, for example, paths that the host-vehicle can take are exhaustively calculated. With regard to the exhaustive calculation method, the driver of the host-vehicle conducts all operations uniformly to calculate the respective paths.

The path planning section 65 acquires a traffic rule (a traffic rule which is most likely to be observed) around the current position from the map database 60*b*. Then, the path planning section 65 selects an optimal path candidate (target path), which can observe the traffic rule on the expected travel path of the host-vehicle, from a plurality of generated paths.

As processing for selecting the optimal path candidate, the following processing may be performed. Path candidates (plural number) that can observe the traffic rule are limited from among a plurality of path candidates. Further, a plurality of path candidates are generated for each mobile object around the host-vehicle (corresponding to a mobile object travel path acquisition unit), and path candidates that can observe the traffic rule are limited from among a plurality of path candidates. Then, the collision probability of the limited path candidates of the host-vehicle and the limited path candidates of each mobile object is calculated, and a path candidate having a lowest collision probability against an obstacle is selected from among the limited path candidates of the host-vehicle. As the method of selecting the optimal path candidates, various other methods may be applied.

If a target path is selected, the path planning section 65 calculates a steering control amount, a throttle control amount, and a brake control amount necessary for traveling along the target path on the basis of the current travel state of the host-vehicle. Then, the path planning section 65 transmits the steering control signal representing the steering control amount to the steering actuator 62, transmits the engine control signal representing the throttle control amount to the throttle actuator 63, and transmits the brake control signal representing the brake control amount to the brake actuator 64.

In the example of FIG. 3, let us say that the host-vehicle MV is traveling on the priority road P. In this case, with respect to the host-vehicle MV approaching the intersection C, a plurality of path candidates are generated. Further, the rule is corrected such that the non-priority road N has higher priority than the priority road P, and with regard to the priority road P, a traffic rule, such as stop or slow, is added. Accordingly, even though the host-vehicle MV is traveling on the priority road P, such a path candidate where the host-vehicle MV stops or reduces its speed before the intersection C is selected from among a plurality of path candidates.

In the example of FIG. 4, let us say that the host-vehicle MV is traveling on the priority road P1 which has the shielding objects S and S. In this case, with respect to the host-vehicle MV approaching the intersection C, a plurality of path candidates are generated. Further, the rule is corrected such that the priority road P1 has lowest priority, and with regard to the priority road P1, a traffic rule, such as stop or slow, is added. Accordingly, even though the host-vehicle MV is traveling on the priority road P1, such a path candidate where the host-vehicle MV stops or reduces its speed before the intersection C is selected from among a plurality of path candidates.

In the example of FIG. 5, let us say that the host-vehicle MV is traveling on the priority road P. In this case, with respect to the host-vehicle MV approaching the intersection C, a plurality of path candidates are generated. Further, the rule is corrected such that the descending non-priority road N1 has highest priority, and with regard to the priority road P, a traffic rule, such as stop or slow, is added. Accordingly, even though the host-vehicle MV is traveling on the priority road P, such a path candidate where the host-vehicle MV stops or reduces its speed before the intersection C is selected from among a plurality of path candidates.

In the example of FIG. 9, let us say that the host-vehicle MV is traveling on the priority road P. In this case, with respect to the host-vehicle MV approaching the intersection C, a plurality of path candidates are generated. Further, the rule is corrected such that entrance to the one-way road N1 is prohibited at rush hour, and a traffic rule that entrance to the one-way road N1 is prohibited at rush hour is added. Accordingly, even though there is a path candidate that allows the host-vehicle MV to efficiently turn left, such a path candidate where the host-vehicle MV goes straight through the intersection C is selected from among a plurality of path candidates.

Figure 18:
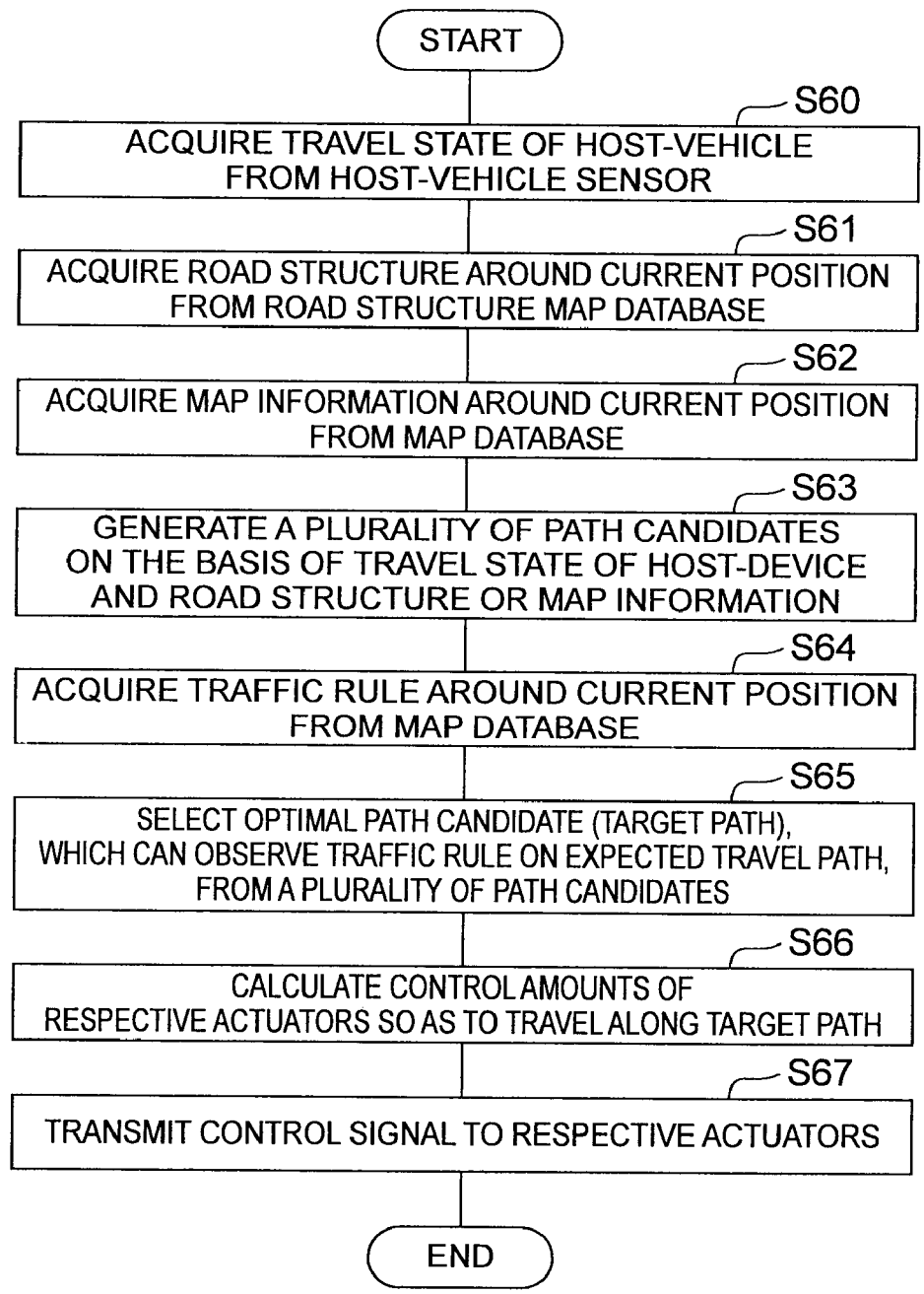
FIG. 18 is a flowchart showing the flow of processing in a path planning section of FIG. 17.

The operation of the automatic driving apparatus 6 will be described with reference to FIG. 17. In particular, processing in the path planning section 65 will be described with reference to a flowchart of FIG. 18. FIG. 18 is a flowchart showing the flow of processing in the path planning section of FIG. 17.

The rule correction device 60 carries out the same operation as in either the rule correction device 3 according to the first embodiment or the rule correction device 4 according to the second embodiment to correct the traffic rule of the map database 60b as occasion demands.

The host-vehicle sensor 61 detects various travel states of the host-vehicle at each predetermined time interval. The path planning section 65 acquires the travel state of the host-vehicle (S60). The path planning section 65 also acquires the road structure around the current position from the road structure map database 60a (S61). The path planning section 65 further acquires map information around the current position from the map database 60b (S62). Then, the path planning section 65 generates a plurality of path candidates on the basis of the travel state of the host-vehicle and the road structure or map information (S63).

The path planning section 65 acquires the traffic rule around the current position from the map database 60b (S64). Then, the path planning section 65 selects an optimal path candidate (target path), which can observe the traffic rule on the expected travel path, from among a plurality of path candidates (S65).

The path planning section 65 calculates the control amounts of the respective actuators 62, 63, and 64 necessary for travel along the target path (S66). Then, the path planning section 65 transmits the steering control signal to the steering actuator 62, transmits the engine control signal to the throttle actuator 63, and transmits the brake control signal to the brake actuator 64. When receiving the steering control signal, the steering actuator 62 generates steering torque in accordance with the steering control signal, and gives a predetermined steering force to the steering mechanism. When receiving the engine control signal, the throttle actuator 63 adjusts the degree of opening of the throttle valve in accordance with the engine control signal, and generates predetermined engine power. When receiving the brake control signal, the brake actuator 64 adjusts the brake oil pressure of the wheel cylinder in accordance with the brake control signal, and generates a predetermined brake force. When this happens, the host-vehicle travels along the target path.

According to this automatic driving apparatus 6, automatic driving is performed with an optimal path candidate, which can observe a traffic rule which is most likely to be observed in each region, as a target path, so safety can be ensured by the relationship with a mobile object around the host-vehicle, and efficiency when the host-vehicle goes toward the destination can be improved. As a result, safety and efficiency can be achieved together satisfactorily. In particular, according to the automatic driving apparatus 6, a traffic rule which is corrected on the basis of the road structure or a traffic rule which is corrected on the basis of the actual traffic conditions is used, so determination can be made by a traffic rule suitable for the condition of each region.

While the embodiment according to the invention has been described, the invention is not limited to the embodiment, and various alterations or modifications can be made.

For example, in this embodiment, application may be made to the risk region determination device, the rule correction device, the driving assist apparatus (warning output), and the automatic driving apparatus, but the invention may be applied to other driving assist apparatuses that require a traffic rule that a mobile object is highly likely to observe in each region (intersection or the like) or information regarding a risk region.

While this embodiment is configured such that traffic rule is corrected when a traffic rule which is highly likely to be actually observed does not conform to a predefined traffic rule, a new traffic rule may be generated in accordance with a traffic rule which is highly likely to be actually observed.

While this embodiment is mainly applied to a traffic rule representing the priority-to-non-priority relationship between the roads, the invention may be applied to various other traffic rules.

Risk region determination may be made by the combination of the risk region determination method according to the first embodiment (the method based on the road structure) and the risk region determination method according to the second embodiment (the method based on the actual traffic conditions). Further, traffic rule correction may be made by the combination of the rule correction method according to the first embodiment (the method based on the road structure) and the rule correction method according to the second embodiment (the method based on the actual traffic conditions).

The driving assist apparatus according to this embodiment is configured such that, when it is determined that the host-vehicle cannot observe a traffic rule, warning is output, but other kinds of driving assist, such as automatic braking and the like, may be performed.

This embodiment is configured such that a risk region is set on the basis of a traffic rule which is highly likely to be observed based on the road structure of each road region or traffic know-how (actual traffic conditions), or a traffic rule is corrected, and then various kinds of driving assist (including automatic driving) are performed. Alternatively, various kinds of driving assist may be performed on the basis of a traffic rule which is unlikely to be observed based on the road structure of each road region or traffic know-how, or various kinds of driving assist may be performed on the basis of the degree of observance of a traffic rule based on the road structure of each road region or traffic know-how.

What is claimed is:

1. A driving assist apparatus that performs driving assist on the basis of a traffic rule for mobile objects including a host-vehicle, wherein driving assist is performed on the basis of whether or not a predefined traffic law in a specified region including a region, in which a road intersects with a road, conforms to an applicable traffic rule that is actually being applied due to a specified road condition or road structure unique to the specified region.

2. The driving assist apparatus according to claim 1, comprising:

a traffic rule acquisition unit acquiring the applicable traffic rule actually being applied in the specified region, wherein driving assist is performed on the basis of the applicable traffic rule that is actually being applied in the specified region and is acquired by the traffic rule acquisition unit.

3. The driving assist apparatus according to claim 2, further comprising:
a region acquisition unit acquiring a traffic rule deviation region where the predefined traffic law in the specified region does not conform to the applicable traffic rule that is actually being applied in the specified region and is acquired by the traffic rule acquisition unit.

4. The driving assist apparatus according to claim 2, further comprising:
a traffic rule correction unit correcting the predefined traffic law in the specified region to the applicable traffic rule that is actually being applied in the specified region and is acquired by the traffic rule acquisition unit when the predefined traffic law does not conform to the applicable traffic rule that is actually being applied in the specified region and is acquired by the traffic rule acquisition unit.

5. The driving assist apparatus according to claim 3, further comprising:
a traffic rule correction unit correcting the predefined traffic law in the specified region to the applicable traffic rule that is actually being applied in the specified region and is acquired by the traffic rule acquisition unit when the predefined traffic law does not conform to the applicable traffic rule that is actually being applied in the specified region and is acquired by the traffic rule acquisition unit.

6. The driving assist apparatus according to claim 2, further comprising:
a host-vehicle travel path acquisition unit acquiring a plurality of travel paths of the host-vehicle,
wherein a travel path of the host-vehicle is selected from among the plurality of travel paths of the host-vehicle on the basis of the applicable traffic rule that is actually being applied in the specified region and is acquired by the traffic rule acquisition unit, and driving assist is performed with respect to the host-vehicle on the basis of the selected travel path of the host-vehicle.

7. The driving assist apparatus according to claim 3, further comprising:
a host-vehicle travel path acquisition unit acquiring a plurality of travel paths of the host-vehicle,
wherein a travel path of the host-vehicle is selected from among the plurality of travel paths of the host-vehicle on the basis of the applicable traffic rule that is actually being applied in the specified region and is acquired by the traffic rule acquisition unit, and driving assist is performed with respect to the host-vehicle on the basis of the selected travel path of the host-vehicle.

8. The driving assist apparatus according to claim 4, further comprising:
a host-vehicle travel path acquisition unit acquiring a plurality of travel paths of the host-vehicle,
wherein a travel path of the host-vehicle is selected from among the plurality of travel paths of the host-vehicle on the basis of the applicable traffic rule that is actually being applied in the specified region and is acquired by the traffic rule acquisition unit, and driving assist is performed with respect to the host-vehicle on the basis of the selected travel path of the host-vehicle.

9. The driving assist apparatus according to claim 5, further comprising:
a host-vehicle travel path acquisition unit acquiring a plurality of travel paths of the host-vehicle,
wherein a travel path of the host-vehicle is selected from among the plurality of travel paths of the host-vehicle on the basis of the applicable traffic rule that is actually being applied in the specified region and is acquired by the traffic rule acquisition unit, and driving assist is performed with respect to the host-vehicle on the basis of the selected travel path of the host-vehicle.

10. The driving assist apparatus according to claim 2, further comprising:
a mobile object travel path acquisition unit acquiring a plurality of travel paths of a mobile object other than the host-vehicle,
wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

11. The driving assist apparatus according to claim 3, further comprising:
a mobile object travel path acquisition unit acquiring a plurality of travel paths of a mobile object other than the host-vehicle,
wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

12. The driving assist apparatus according to claim 4, further comprising:
a mobile object travel path acquisition unit acquiring a plurality of travel paths of a mobile object other than the host-vehicle,
wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

13. The driving assist apparatus according to claim 5, further comprising:
a mobile object travel path acquisition unit acquiring a plurality of travel paths of a mobile object other than the host-vehicle,
wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

14. The driving assist apparatus according to claim 6, further comprising:

a mobile object travel path acquisition unit acquiring a plurality of travel paths of a mobile object other than the host-vehicle, wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

15. The driving assist apparatus according to claim 7, further comprising:

a mobile object travel path acquisition unit acquiring a plurality of travel paths of a mobile object other than the host-vehicle, wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

16. The driving assist apparatus according to claim 8, further comprising:

a mobile object travel path acquisition unit acquiring a plurality of travel paths of a mobile object other than the host-vehicle, wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

17. The driving assist apparatus according to claim 9, further comprising:

a mobile object travel path acquisition unit acquiring a plurality of travel paths of a mobile object other than the host-vehicle, wherein a travel path of the mobile object other than the host-vehicle is selected from among the plurality of travel paths of the mobile object other than the host-vehicle on the basis of the applicable traffic rule that is actually being applied in the specified region and is acquired by the traffic rule acquisition unit, and driving assist is performed with respect to the host-vehicle in accordance with the selected travel path of the mobile object other than the host-vehicle.

* * * * *